United States Patent
Fujikawa et al.

(10) Patent No.: US 10,465,038 B2
(45) Date of Patent: Nov. 5, 2019

(54) CURABLE COMPOSITION FOR LENS, LENS AND OPTICAL DEVICE

(71) Applicant: DAICEL CORPORATION, Osaka-shi, Osaka (JP)

(72) Inventors: Takeshi Fujikawa, Himeji (JP); Takashi Kubo, Tokyo (JP)

(73) Assignee: DAICEL CORPORATION, Osaka-Shi (JP)

( * ) Notice: Subject to any disclaimer, the term of this patent is extended or adjusted under 35 U.S.C. 154(b) by 525 days.

(21) Appl. No.: 15/103,417

(22) PCT Filed: Dec. 19, 2014

(86) PCT No.: PCT/JP2014/083674
§ 371 (c)(1),
(2) Date: Jun. 10, 2016

(87) PCT Pub. No.: WO2015/098736
PCT Pub. Date: Jul. 2, 2015

(65) Prior Publication Data
US 2016/0311968 A1   Oct. 27, 2016

(30) Foreign Application Priority Data

Dec. 26, 2013  (JP) .................. 2013-269397
Oct. 30, 2014  (JP) .................. 2014-221123

(51) Int. Cl.
*C08G 59/38* (2006.01)
*C08G 59/24* (2006.01)
(Continued)

(52) U.S. Cl.
CPC .......... *C08G 59/38* (2013.01); *B29C 45/0001* (2013.01); *C08G 59/027* (2013.01);
(Continued)

(58) Field of Classification Search
CPC ........ C08G 59/38; C08G 59/24; C08G 59/30; C08G 59/3281; C08G 59/687;
(Continued)

(56) References Cited

U.S. PATENT DOCUMENTS 6,322,892 B1   11/2001 Takami
6,809,889 B2   10/2004 Tokuda et al.
(Continued)

FOREIGN PATENT DOCUMENTS

EP   1 308 471 A2   5/2003
EP   1541567 A1    6/2005
(Continued)

OTHER PUBLICATIONS

Akimoto et al., JP 2010-222411 A machine translation in English, Oct. 7, 2010 (Year: 2010).*
(Continued)

*Primary Examiner* — David T Karst
(74) *Attorney, Agent, or Firm* — Birch, Stewart, Kolasch & Birch, LLP

(57) ABSTRACT

Provided is a curable composition capable of giving a lens that has excellent transfer accuracy from a mold and offers heat resistance and optical properties at excellent levels. The curable composition according to the present invention for lens formation contains a cycloaliphatic epoxide (A) represented by Formula (a), a cationic-polymerization initiator (B), and a polysiloxane (C) represented by Formula (c). The curable composition contains the polysiloxane (C) in an amount of 0.01% to 5% by weight based on the total amount of the curable composition. The curable composition according to the present invention for lens formation may further contain a siloxane compound (D) containing two or more epoxy groups per molecule.

(Continued)

[Chem. 1]

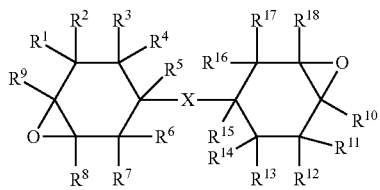

(a)

[Chem. 2]

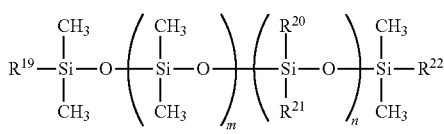

(c)

5 Claims, 1 Drawing Sheet

(51) Int. Cl.

| | | |
|---|---|---|
| *G02B 3/08* | (2006.01) | |
| *G02B 1/04* | (2006.01) | |
| *B29C 45/00* | (2006.01) | |
| *C08G 59/30* | (2006.01) | |
| *C08G 59/32* | (2006.01) | |
| *C08G 59/68* | (2006.01) | |
| *C08G 59/02* | (2006.01) | |
| *C08L 83/04* | (2006.01) | |
| *C08L 63/00* | (2006.01) | |
| *C08L 83/06* | (2006.01) | |

(52) U.S. Cl.
CPC .............. *C08G 59/24* (2013.01); *C08G 59/30* (2013.01); *C08G 59/3281* (2013.01); *C08G 59/687* (2013.01); *G02B 1/041* (2013.01); *G02B 3/08* (2013.01)

(58) Field of Classification Search
CPC ........ C08G 59/027; G02B 3/08; G02B 1/041; B29C 45/0001
USPC ........................................................ 523/433
See application file for complete search history.

(56) References Cited

U.S. PATENT DOCUMENTS

| | | |
|---|---|---|
| 8,071,697 B2 | 12/2011 | Frisch et al. |
| 8,416,514 B2 | 4/2013 | Kim et al. |
| 2003/0113544 A1 | 6/2003 | Tokuda et al. |
| 2008/0185601 A1 | 8/2008 | Frisch et al. |
| 2009/0311630 A1 | 12/2009 | Noro et al. |
| 2010/0256313 A1 | 10/2010 | Nakamura et al. |
| 2010/0321802 A1 | 12/2010 | Kim et al. |
| 2012/0217664 A1 | 8/2012 | Saitou et al. |
| 2013/0072615 A1* | 3/2013 | Muro ............... C08L 35/02 524/406 |
| 2013/0320264 A1* | 12/2013 | Yoshida ............ H01L 33/501 252/301.36 |
| 2015/0212300 A1 | 7/2015 | Kubo et al. |

FOREIGN PATENT DOCUMENTS

| | | | |
|---|---|---|---|
| EP | 1 308 471 B1 | 12/2005 | |
| EP | 2 495 084 A1 | 9/2012 | |
| JP | 11-92539 A | 4/1999 | |
| JP | 2004-149369 A | 5/2004 | |
| JP | 2004-168869 A | 6/2004 | |
| JP | 2005-119124 A | 5/2005 | |
| JP | 2007-238883 A | 9/2007 | |
| JP | 4124991 B2 | 7/2008 | |
| JP | 2009-256604 A | 11/2009 | |
| JP | 2009-298112 A | 12/2009 | |
| JP | 2009-299074 A | 12/2009 | |
| JP | 2010-150489 A | 7/2010 | |
| JP | 2010-179586 A | 8/2010 | |
| JP | 2010-229324 A | 10/2010 | |
| JP | 2010222411 A * | 10/2010 | ............ C08G 59/20 |
| JP | 2011-1401 A | 1/2011 | |
| JP | 2011-508914 A | 3/2011 | |
| JP | 2011052116 A * | 3/2011 | ............ C08G 59/24 |
| JP | 4800383 B2 | 10/2011 | |
| JP | 2012-180498 A | 9/2012 | |
| JP | 2013-18910 A | 1/2013 | |
| JP | 5938041 B2 | 5/2016 | |
| WO | WO 2006/127100 A1 | 11/2006 | |
| WO | WO 2011/052177 A1 | 5/2011 | |
| WO | WO-2011134686 A1 * | 11/2011 | ............ C08L 83/06 |
| WO | WO 2013/011832 A1 | 1/2013 | |
| WO | WO 2014/034507 A1 | 3/2014 | |

OTHER PUBLICATIONS

Yamanoi et al., JP 2011-052116 A machine translation in English, Mar. 17, 2011 (Year: 2011).*
International Search Report, issued in PCT/JP2014/083674, dated Apr. 7, 2015.
Written Opinion of the International Searching Authority, issued in PCT/JP2014/083674, dated Apr. 7, 2015.
Japanese Decision to Grant a Patent for Application No. 2015-554829, dated Aug. 1, 2017, with English language translation.
Japanese Notification of Reasons for Refusal for Application No. 2015-554829, dated Jan. 31, 2017, with English language translation.
Japanese Notification of Reasons for Refusal for Application No. 2015-554829, dated May 23, 2017, with English language translation.
Extended European Search Report, dated Apr. 24, 2019, for European Application No. 18202212.9.
U.S. Office Action for U.S. Appl. No. 15/726,696, dated Aug. 29, 2019.

* cited by examiner

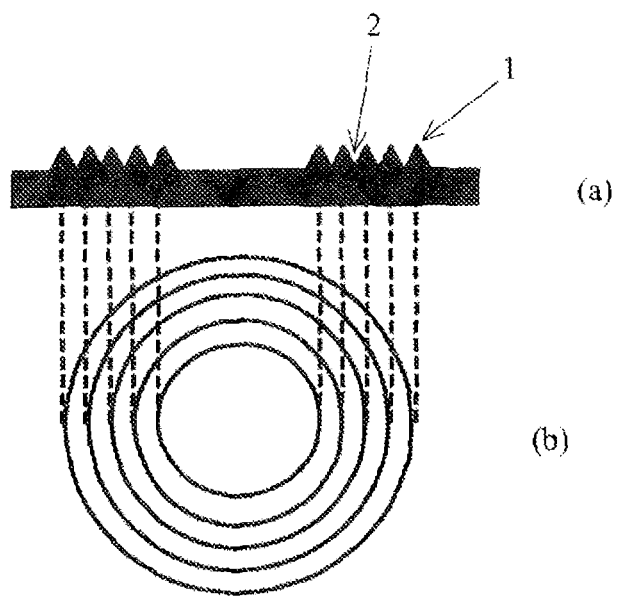

CURABLE COMPOSITION FOR LENS, LENS AND OPTICAL DEVICE

TECHNICAL FIELD

The present invention relates to a curable composition for lens formation, which is a curable composition suitable for lens production using a mold; to a lens obtained by curing the curable composition for lens formation; and to an optical device including the lens. This application claims priority to Japanese Patent Application No. 2013-269397 filed to Japan Dec. 26, 2013, and to Japanese Patent Application No. 2014-221123 filed to Japan Oct. 30, 2014, the entire contents of which are incorporated herein by reference.

BACKGROUND ART

Electronic products undergo significant reduction in size and weight and extraordinary increase in performance. Such electronic products are represented typically by cellular phones, smartphones, tablet terminals, mobile computers, personal digital assistants (PDAs), and digital still cameras (DSCs). With the technological trend as above, demands are increasingly made to achieve reduction in size, weight, and/or thickness of lenses for use typically in cameras to be mounted to the electronic products.

The lenses are generally produced by a molding (forming) technique using a mold, such as injection molding or cast molding. Known materials for use in lens formation include thermoplastic resins such as polycarbonates; and thermal- or photo-curable resins such as acrylic resins and silicone resins (Patent Literature (PTL) 1 to 4). However, the thermoplastic resins do not have reflow heat resistance, and, for example, camera modules using lenses made from the thermoplastic resins should be assembled in a step different from other parts, and this disadvantageously complicates the production process. In contrast, lenses made from acrylic resins or silicone resins are superior in heat resistance, but are not yet satisfactory in optical properties.

CITATION LIST

Patent Literature

PTL 1: Japanese Unexamined Patent Application Publication (JP-A) No. 2005-119124
PTL 2: Japanese Patent No. 4800383
PTL 3: Japanese Patent No. 4124991
PTL 4: JP-A No. H11-092539

SUMMARY OF INVENTION

Technical Problem

The inventors of the present invention found that a cationically curable compound containing a cycloaliphatic epoxy group, when used, gives a lens having heat resistance and optical properties both at excellent levels. However, the inventors also found as follows. When wafer-level lenses and other lenses reduced in size, weight, and/or thickness, and Fresnel lenses and other specially-shaped lenses are produced using a mold, "bubble entrapment" often occurs upon charging of a curable composition containing the cationically curable compound into the mold, and the "bubble entrapment" impairs transfer accuracy from the mold.

Accordingly, the present invention has an object to provide a curable composition capable of forming a lens that has excellent transfer accuracy from the mold and offers heat resistance and optical properties at excellent levels.

The present invention has another object to provide a lens and a method for producing the lens, where the lens has excellent transfer accuracy from the mold and offers heat resistance and optical properties at excellent levels.

The present invention has yet another object to provide an optical device including the lens.

Solution to Problem

After intensive investigations to achieve the objects, the inventors have found that a curable composition including a specific epoxide and a specific polysiloxane can have better wettability with a mold, and this eliminates or minimizes the occurrence of "bubble entrapment" upon charging of the curable composition into the mold; and that the curable composition has excellent curability and gives a lens having heat resistance, optical properties, and transfer accuracy from the mold at excellent levels. The present invention has been made based on these findings.

Specifically, the present invention provides a curable composition for lens formation, including a cycloaliphatic epoxide (A) represented by Formula (a), a cationic-polymerization initiator (B), and a polysiloxane (C) represented by Formula (c). The curable composition contains the polysiloxane (C) in a content of 0.01% to 5% by weight based on the total amount (100% by weight) of the curable composition. Formulae (a) and (c) are expressed as follows:

[Chem. 1]

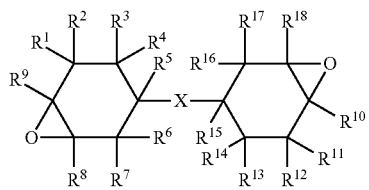

(a)

where $R^1$ to $R^{18}$ are each, identically or differently, selected from hydrogen, halogen, a hydrocarbon group which may contain oxygen or halogen, and optionally substituted alkoxy; X is selected from a single bond and a linkage group excluding a siloxane-bond-containing group,

[Chem. 2]

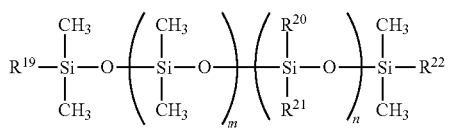

(c)

where $R^{19}$ to $R^{22}$ each represent, identically or differently in each occurrence, a group selected from hydrogen, alkyl, haloalkyl, aryl, aralkyl, alkoxy, acyloxy, and —RNHCOR', where R is selected from alkylene and alkenylene, and R' is selected from alkyl and alkenyl; and m and n each represent, identically or differently, an integer of 1 or more.

The curable composition for lens formation may further include a siloxane compound (D) containing two or more epoxy groups per molecule.

The curable composition for lens formation may further include a cationically curable compound containing one or more oxetane groups per molecule, excluding compounds belonging to the cycloaliphatic epoxide (A) and the siloxane compound (D).

The curable composition for lens formation may further include a cationically curable compound containing one or more glycidyl ether groups per molecule, excluding compounds belonging to the cycloaliphatic epoxide (A) and the siloxane compound (D).

The curable composition for lens formation may contain the cycloaliphatic epoxide (A) in a content of 5% to 60% by weight based on the total amount (100% by weight) of the curable composition.

The curable composition for lens formation may be used to form a wafer-level lens.

The curable composition for lens formation may be used to form a Fresnel lens.

The curable composition for lens formation may be used to form a lens for camera flash.

The present invention also provides a method for producing a lens, where the method includes steps 1 and 2 as follows. In the step 1, the curable composition for lens formation is charged into a lens-forming mold. In the step 2, light is applied to the curable composition to cure the curable composition.

In the lens production method, a silicon mold may be used as the lens-forming mold.

In the step 2 in the lens production method, light at 350 to 450 nm may be applied from a UV-LED to cure the curable composition.

In the step 2 in the lens production method may further include annealing after the light application.

In the step 1 in the lens production method, a lens-forming mold having two or more lens patterns may be used as the lens-forming mold.

In the lens production method, the lens may be obtained by using a lens-forming mold having two or more lens patterns as the lens-forming mold in the step 1, subjecting an article obtained from the step 1 to the step 2 to give a coupled lens assembly including two or more lenses coupled to each other, and cutting the coupled lens assembly.

The present invention also provides a lens that is obtained by the lens production method and includes two or more lenses coupled to each other.

The present invention also provides a lens obtained by the lens production method.

The lens may be a wafer-level lens.

The lens may be a Fresnel lens.

The lens may be a lens for camera flash.

In addition and advantageously, the present invention provides an optical device including the lens.

Specifically, the present invention relates to followings.

(1) The present invention relates to a curable composition for lens formation. The curable composition contains a cycloaliphatic epoxide (A) represented by Formula (a), a cationic-polymerization initiator (B), and a polysiloxane (C) represented by Formula (c). The curable composition for lens formation contains the polysiloxane (C) in a content of 0.01% to 5% by weight based on the total amount (100% by weight) of the curable composition.

(2) The curable composition according to (1) for lens formation may further include a siloxane compound (D) containing two or more epoxy groups per molecule.

(3) The curable composition according to one of (1) and (2) for lens formation may further include a cationically curable compound containing one or more oxetane groups per molecule (excluding compounds belonging to the cycloaliphatic epoxide (A) and the siloxane compound (D)).

(4) The curable composition according to any one of (1) to (3) for lens formation may further include a cationically curable compound containing one or more glycidyl ether groups per molecule (excluding compounds belonging to the cycloaliphatic epoxide (A) and the siloxane compound (D)).

(5) The curable composition according to any one of (1) to (4) for lens formation may contain the cycloaliphatic epoxide (A) in a content of 5% to 60% by weight based on the total amount (100% by weight) of the curable composition for lens formation.

(6) The cycloaliphatic epoxide (A) in the curable composition according to any one of (1) to (5) for lens formation may be at least one compound selected from the group consisting of (3,4,3',4'-diepoxy)bicyclohexyl, bis(3,4-epoxycyclohexylmethyl) ether, and 2,2-bis(3,4-epoxycyclohex-1-yl)propane.

(7) The curable composition according to any one of (1) to (6) for lens formation may contain the cycloaliphatic epoxide (A) in an amount of 10% to 50% by weight based on the total amount (100% by weight) of all cationically curable compounds contained in the curable composition for lens formation.

(8) The cationic-polymerization initiator (B) in the curable composition according to any one of (1) to (7) for lens formation may be a sulfonium salt compound.

(9) The cationic-polymerization initiator (B) in the curable composition according to any one of (1) to (8) for lens formation may contain an arylsulfonium ion as a cationic moiety.

(10) The curable composition according to any one of (1) to (9) for lens formation may contain the cationic-polymerization initiator (B) in an amount of 0.01 to 15 parts by weight per 100 parts by weight of all cationically curable compounds contained in the curable composition for lens formation.

(11) The curable composition according to any one of (1) to (10) for lens formation may contain the polysiloxane (C) in an amount of 0.01 to 5 parts by weight per 100 parts by weight of all cationically curable compounds contained in the curable composition for lens formation.

(12) The siloxane compound (D) in the curable composition according to any one of (2) to (11) for lens formation may be a compound represented by Formula (d).

(13) The siloxane compound (D) in the curable composition according to any one of (2) to (11) for lens formation may be at least one selected from the group consisting of compounds represented by Formulae (d-1) to (d-7).

(14) The curable composition according to any one of (2) to (13) for lens formation may contain the siloxane compound (D) in a content of 1% to 60% by weight based on the total amount (100% by weight) of the curable composition for lens formation.

(15) The curable composition according to any one of (1) to (14) for lens formation may further contain at least one of a hydrogenated glycidyl ether epoxide and an oxetane compound in an amount of 5% to 60% by weight based on the total amount (100% by weight) of all cationically curable compounds contained in the curable composition for lens formation.

(16) The curable composition according to any one of (1) to (15) for lens formation may further contain a hydrogenated glycidyl ether epoxide in an amount of 5% to 60% by weight based on the total amount (100% by weight) of all cationically curable compounds contained in the curable composition for lens formation.

(17) The curable composition according to any one of (1) to (16) for lens formation may further contain an oxetane compound in an amount of 5% to 30% by weight based on the total amount (100% by weight) of all cationically curable compounds contained in the curable composition for lens formation.

(18) The curable composition according to any one of (1) to (17) for lens formation may have a viscosity of 2000 mPa·s or less at a temperature of 25° C. and a rotation speed of 20 revolutions per second.

(19) The curable composition according to any one of (1) to (18) for lens formation may have a contact angle of 50° or less with respect to a silicon substrate, where the contact angle is determined by a sessile drop method.

(20) The curable composition according to any one of (1) to (19) for lens formation may be used to form a wafer-level lens.

(21) The curable composition according to any one of (1) to (19) for lens formation may be used to form a Fresnel lens.

(22) The curable composition according to any one of (1) to (19) for lens formation may be used to form a lens for camera flash.

(23) The present invention also relates to a cured product of the curable composition according to any one of (1) to (22) for lens formation.

(24) The cured product according to (23) may have a transmittance of 70% or more at 400 nm in terms of 0.5 mm thickness.

(25) The cured product according to one of (23) and (24) may have a glass transition temperature (Tg) of 100° C. or higher.

(26) The cured product according to any one of (23) to (25) may have a linear expansion coefficient α1 of 40 to 100 ppm/° C. at temperatures equal to or lower than the glass transition temperature and a linear expansion coefficient α2 of 90 to 150 ppm/° C. at temperatures equal to or higher than the glass transition temperature.

(27) The cured product according to any one of (23) to (26) may have a storage modulus of 0.1 GPa or more at 25° C.

(28) The present invention also relates to a lens including the cured product according to any one of (23) to (27).

(29) The present invention also relates to a method for producing a lens. The method includes the steps 1 and 2 as follows. In the step 1, the curable composition according to any one of (1) to (22) for lens formation is charged into a lens-forming mold. In the step 2, light is applied to cure the curable composition.

(30) The lens production method according to (29) may use a silicon mold as the lens-forming mold.

(31) The step 2 in the lens production method according to one of (29) and (30) may include applying light at 350 to 450 nm from a UV-LED to cure the curable composition.

(32) The step 2 in the lens production method according to any one of (29) to (31) may further include annealing after the light application.

(33) In the step 1 in the lens production method according to any one of (29) to (32), a lens-forming mold having two or more lens patterns may be used as the lens-forming mold.

(34) The lens production method according to any one of (29) to (32) may be performed by using a lens-forming mold having two or more lens patterns as the lens-forming mold in the step 1, subjecting an article from the step 1 to the step 2 to give a coupled lens assembly including two or more lenses coupled to each other, and cutting the obtained coupled lens assembly to give lenses.

(35) The present invention also relates to a lens produced by the lens production method according to (33) and including two or more lenses coupled to each other.

(36) The present invention also relates to a lens produced by the lens production method according to any one of (29) to (34).

(37) The lens according to one of (35) and (36) may be a wafer-level lens.

(38) The lens according to one of (35) and (36) may be a Fresnel lens.

(39) The lens according to one of (35) and (36) may be a lens for camera flash.

(40) In addition and advantageously, the present invention relates to an optical device including the lens according to any one of (35) to (39).

Advantageous Effects of Invention

The curable composition according to the present invention for lens formation, as having the configuration, has better wettability with a mold, and this eliminates or minimizes the occurrence of "bubble entrapment" upon charging of the curable composition into the mold. In addition, the curable composition has excellent curability and can form a cured product having heat resistance and optical properties (such as transparency, high refractive index, and yellowing resistance) at excellent levels. Thus, the use of the curable composition according to the present invention for lens formation gives a lens that has excellent transfer accuracy from the mold and offers heat resistance and optical properties at excellent levels. The curable composition is therefore advantageously usable for the production of wafer-level lenses and other lenses reduced in size, weight, and/or thickness; and Fresnel lenses and other specially-shaped lenses, where the production is performed using a mold.

The lens according to the present invention is made from (derived from) the curable composition for lens formation as a material and thereby has excellent transfer accuracy from the mold and offers heat resistance and optical properties at excellent levels.

The optical device according to the present invention has high quality because of including the lens having excellent transfer accuracy from the mold and offering heat resistance and optical properties at excellent levels.

As used herein the term "wafer-level lens" refers to a lens for use in wafer-level production of a camera to be used typically in a cellular phone. A single wafer-level lens has dimensions of a diameter of about 1 to about 10 mm and a thickness of about 100 to about 2000 μm.

The term "Fresnel lens" refers to a lens that is designed by dividing a regular lens into a set of concentric annular sections and has a smaller thickness as compared with the regular lens. The Fresnel lens has a ridged (sawtooth) cross sections. A single Fresnel lens has dimensions of a diameter of about 1 to about 10 mm and a thickness of about 100 to about 2000 μm.

BRIEF DESCRIPTION OF DRAWINGS

FIGS. 1(a) and 1(b) are a schematic cross-sectional view and d schematic top view, respectively, of a Fresnel lens.

DESCRIPTION OF EMBODIMENTS

Curable Composition for Lens Formation
The curable composition according to the present invention for lens formation is hereinafter also simply referred to as a "curable composition". The curable composition contains a cycloaliphatic epoxide (A), a cationic-polymerization initiator (B), and a polysiloxane (C). The curable composition contains the polysiloxane (C) in an amount of 0.01% to 5% by weight based on the total amount (100% by weight) of the curable composition.

Cycloaliphatic Epoxide (A)

The cycloaliphatic epoxide (A) as an essential component of the curable composition according to the present invention is a cationically curable compound represented by Formula (a). However, the term "cycloaliphatic epoxide (A)" excludes siloxane-bond-containing compounds. Formula (a) is expressed as follows:

[Chem. 3]

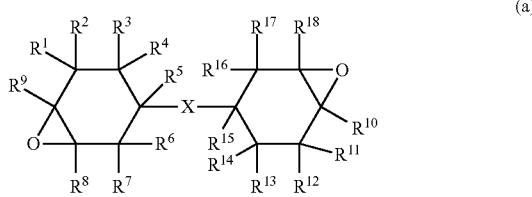

(a)

In Formula (a), $R^1$ to $R^{18}$ are each, identically or differently, selected from hydrogen, halogen, a hydrocarbon group which may contain oxygen or halogen, and optionally substituted alkoxy.

Non-limiting examples of the halogen as $R^1$ to $R^{18}$ include fluorine, chlorine, bromine, and iodine.

Examples of the hydrocarbon group as $R^1$ to $R^{18}$ include aliphatic hydrocarbon groups, alicyclic hydrocarbon groups, aromatic hydrocarbon groups, and groups including two or more of them bonded to each other.

Non-limiting examples of the aliphatic hydrocarbon groups include $C_1$-$C_{20}$ alkyl such as methyl, ethyl, propyl, isopropyl, butyl, hexyl, octyl, isooctyl, decyl, and dodecyl, of which $C_1$-$C_{10}$ alkyl is preferred, and $C_1$-$C_4$ alkyl is particularly preferred; $C_2$-$C_{20}$ alkenyl such as vinyl, allyl, methallyl, 1-propenyl, isopropenyl, 1-butenyl, 2-butenyl, 3-butenyl, 1-pentenyl, 2-pentenyl, 3-pentenyl, 4-pentenyl, and 5-hexenyl, of which $C_2$-$C_{10}$ alkenyl is preferred, and $C_2$-$C_4$ alkenyl is particularly preferred; and $C_2$-$C_{20}$ alkynyl such as ethynyl and propynyl, of which $C_2$-$C_{10}$ alkynyl is preferred, and $C_2$-$C_4$ alkynyl is particularly preferred.

Non-limiting examples of the alicyclic hydrocarbon groups include $C_3$-$C_{12}$ cycloalkyl such as cyclopropyl, cyclobutyl, cyclopentyl, cyclohexyl, and cyclododecyl; $C_3$-$C_{12}$ cycloalkenyl such as cyclohexenyl; and $C_4$-$C_{15}$ bridged hydrocarbon groups such as bicycloheptyl and bicycloheptenyl.

Non-limiting examples of the aromatic hydrocarbon groups include $C_6$-$C_{14}$ aryl such as phenyl and naphthyl, of which $C_6$-$C_{10}$ aryl is preferred.

Non-limiting examples of the groups including two or more groups selected from the aliphatic hydrocarbon groups, the alicyclic hydrocarbon groups, and the aromatic hydrocarbon groups include $C_3$-$C_{12}$ cycloalkyl-substituted $C_1$-$C_{20}$ alkyl such as cyclohexylmethyl; $C_1$-$C_{20}$ alkyl-substituted $C_3$-$C_{12}$ cycloalkyl such as methylcyclohexyl; $C_7$-$C_{18}$ aralkyl such as benzyl and phenethyl, of which $C_7$-$C_{10}$ aralkyl is typified by; $C_6$-$C_{14}$ aryl-substituted $C_2$-$C_{20}$ alkenyl such as cinnamyl; $C_1$-$C_{20}$ alkyl-substituted $C_6$-$C_{14}$ aryl such as tolyl; and $C_2$-$C_{20}$ alkenyl-substituted $C_6$-$C_{14}$ aryl such as styryl.

Non-limiting examples of the hydrocarbon group which may contain oxygen or halogen, as $R^1$ to $R^{18}$, include groups corresponding to the hydrocarbon groups, except with an oxygen-containing group and/or a halogen atom replacing at least one hydrogen atom. Non-limiting examples of the oxygen-containing group include hydroxy; hydroperoxy; $C_1$-$C_{10}$ alkoxy such as methoxy, ethoxy, propoxy, isopropyloxy, butoxy, and isobutyloxy; alkenyloxy such as allyloxy; tolyloxy, naphthyloxy, and other $C_6$-$C_{14}$ aryloxy which may be substituted with one or more substituents selected from the group consisting of $C_1$-$C_{10}$ alkyl, $C_2$-$C_{10}$ alkenyl, halogen, and $C_1$-$C_{10}$ alkoxy; $C_7$-$C_{18}$ aralkyloxy such as benzyloxy and phenethyloxy; $C_1$-$C_{10}$ acyloxy such as acetyloxy, propionyloxy, (meth)acryloyloxy, and benzoyloxy; $C_1$-$C_{10}$ alkoxycarbonyl such as methoxycarbonyl, ethoxycarbonyl, propoxycarbonyl, and butoxycarbonyl; and phenoxycarbonyl, tolyloxycarbonyl, naphthyloxycarbonyl and other $C_6$-$C_{14}$ aryloxycarbonyl which may be substituted with one or more substituents selected from the group consisting of $C_1$-$C_{10}$ alkyl, $C_2$-$C_{10}$ alkenyl, halogen, and $C_1$-$C_{10}$ alkoxy; $C_7$-$C_{18}$ aralkyloxycarbonyl such as benzyloxycarbonyl; epoxy-containing groups such as glycidyloxy; oxetanyl-containing groups such as ethyloxetanyloxy; $C_1$-$C_{10}$ acyl such as acetyl, propionyl, and benzoyl; isocyanato; sulfo; carbamoyl; oxo; and groups including two or more of these groups bonded to each other with or without the medium typically of $C_1$-$C_{10}$ alkylene.

Examples of the alkoxy as $R^1$ to $R^{18}$ include $C_1$-$C_{10}$ alkoxy such as methoxy, ethoxy, propoxy, isopropyloxy, butoxy, and isobutyloxy.

Non-limiting examples of the substituents which the alkoxy may have include halogen, hydroxy, $C_1$-$C_{10}$ alkoxy, $C_2$-$C_{10}$ alkenyloxy, $C_6$-$C_{14}$ aryloxy, $C_1$-$C_{10}$ acyloxy, mercapto, alkylthio, $C_2$-$C_{10}$ alkenylthio, $C_6$-$C_{14}$ arylthio, $C_7$-$C_{18}$ aralkylthio, carboxy, alkoxy-carbonyl, $C_6$-$C_{14}$ aryloxy-carbonyl, $C_7$-$C_{18}$ aralkyloxy-carbonyl, amino, mono- or di-($C_1$-$C_{10}$ alkyl)amino, acylamino, epoxy-containing groups, oxetanyl-containing groups, $C_1$-$C_{10}$ acyl, oxo, and groups including two or more of these groups bonded to each other with or without the medium typically of $C_1$-$C_{10}$ alkylene.

In Formula (a), X is selected from a single bond and a linkage group. The "linkage group" refers to a divalent group containing one or more atoms, but excludes siloxane-bond-containing groups. Non-limiting examples of the linkage group include divalent hydrocarbon groups, carbonyl, ether bond, ester bond, carbonate, amido, and groups including two or more of these groups coupled to each other.

The divalent hydrocarbon groups include $C_1$-$C_{18}$ straight or branched chain alkylene and divalent alicyclic hydrocarbon groups. Non-limiting examples of the $C_1$-$C_{10}$ straight or branched chain alkylene include methylene, methylmethylene, dimethylmethylene, ethylene, propylene, and trimethylene. Non-limiting examples of the divalent alicyclic hydrocarbon groups include cycloalkylene (including cycloalkylidene), such as 1,2-cyclopentylene, 1,3-cyclopentylene, cyclopentylidene, 1,2-cyclohexylene, 1,3-cyclohexylene, 1,4-cyclohexylene, and cyclohexylidene.

In particular, the linkage group as X is preferably selected from oxygen-containing linkage groups such as —CO—, —O—CO—O—, —COO—, —O—, —CONH—; groups including two or more of these groups coupled to each other; and groups including one or more of these groups coupled to one or more of the divalent hydrocarbon groups.

Representative examples of the cycloaliphatic epoxide represented by Formula (a) include, but are not limited to, (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, 1,2-bis(3,4-epoxycyclohex-1-yl)ethane, and compounds exemplified by Formulae (a-1) to (a-10) below. In Formulae (a-5) and (a-7), $n^1$ and $n^2$ each independently represent an integer of 1 to 30. L in Formula (a-5) represents, independently in each occurrence, $C_1$-$C_8$ alkylene and is exemplified by straight or branched chain alkylene such as methylene, ethylene, propylene, isopropylene, butylene, isobutylene, s-butylene, pentylene, hexylene, heptylene, and octylene. Among them, L is preferably selected from $C_1$-$C_3$ straight or branched chain alkylene such as methylene, ethylene, propylene, and isopropylene. In Formulae (a-9) and (a-10), $n^3$ to $n^8$ each represent, identically or differently, an integer of 1 to 30.

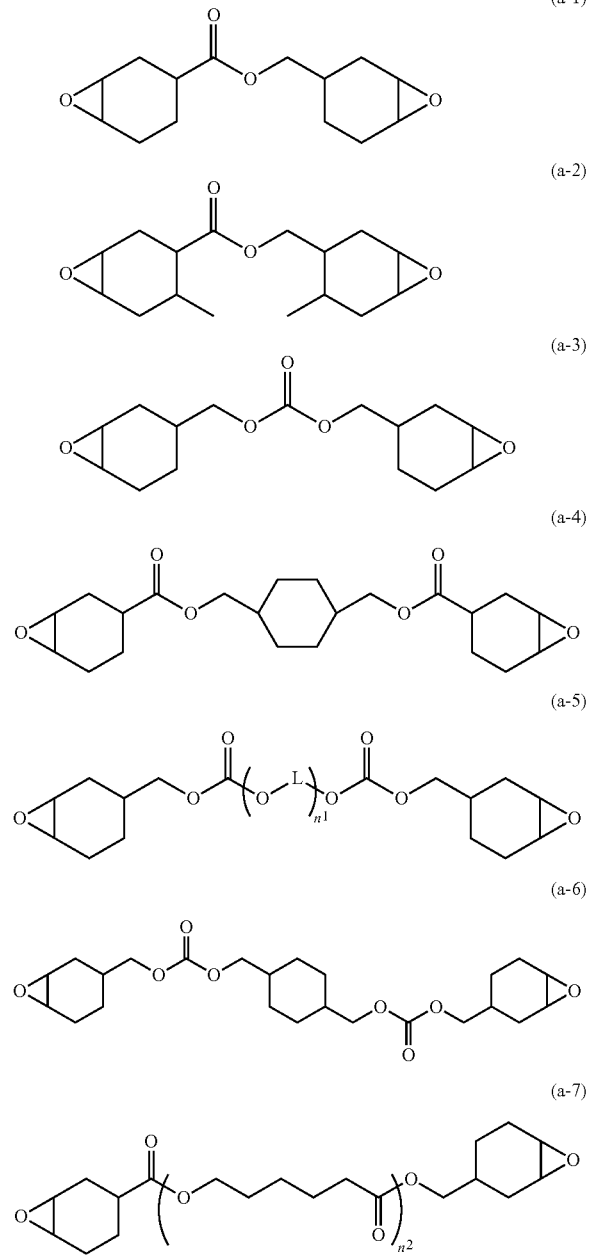
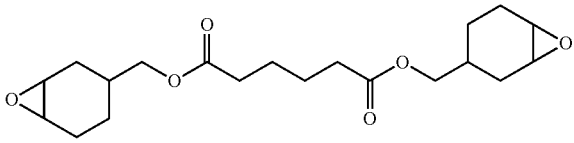
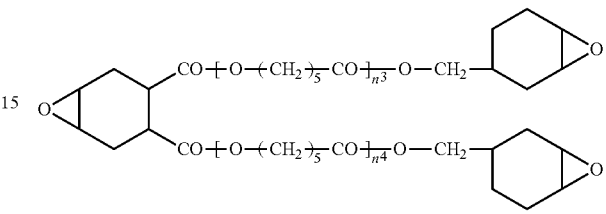

The curable composition according to the present invention may contain each of different cycloaliphatic epoxides (A) alone or in combination. The cycloaliphatic epoxides (A) may be produced by known or common methods.

In particular, the curable composition preferably contains, as the cycloaliphatic epoxide (A), at least one selected from the group consisting of (3,4,3',4'-diepoxy)bicyclohexyl, bis(3,4-epoxycyclohexylmethyl) ether, and 2,2-bis(3,4-epoxycyclohex-1-yl)propane, as an essential component. This is preferred because the curable composition has excellent curability and can give a cured product that has excellent properties such as heat resistance, optical properties, moisture resistance, low shrinkage, and low linear expansion.

The curable composition according to the present invention may contain the cycloaliphatic epoxide (A) in a content (blending amount) of preferably 5% to 60% by weight, more preferably 10% to 55% by weight, and furthermore preferably 15% to 50% by weight, based on the total amount (100% by weight) of the curable composition. The curable composition, if containing the cycloaliphatic epoxide (A) in a content out of the range, may hardly allow the cured product to have heat resistance and mechanical strength both at high levels.

The curable composition may contain the cycloaliphatic epoxide (A) in a content (blending amount) of preferably 10% to 50% by weight, more preferably 15% to 45% by weight, and furthermore preferably 20% to 40% by weight, based on the total amount (100% by weight) of all cationically curable compounds (the total amount of all cationically curable compounds such as epoxides and oxetane compounds) contained in the curable composition. The curable composition, if containing the cycloaliphatic epoxide (A) in a content less than the range, may have insufficient curability and may cause the cured product to be insufficient in properties such as moisture resistance, heat resistance (glass transition temperature), low shrinkage, and low linear expansion, in some usage modes. In contrast, the curable composition, if containing the cycloaliphatic epoxide (A) in a content greater than the range, may cause the cured product to have insufficient mechanical strength.

Cationic-Polymerization Initiator (B)

The cationic-polymerization initiator for use in the present invention may be selected from a cationic photoinitiator and a cationic thermal initiator.

The "cationic photoinitiator" refers to a compound that generates a cationic species via light application to initiate a curing reaction of a cationically curable compound. The cationic photoinitiator includes a cationic moiety and an anionic moiety, where the cationic moiety absorbs the light, and the anionic moiety serves as an acid source.

Non-limiting examples of the cationic photoinitiator include diazonium salt compounds, iodonium salt compounds, sulfonium salt compounds, phosphonium salt compounds, selenium salt compounds, oxonium salt compounds, ammonium salt compounds, and bromine salt compounds. Among them, the cationic photoinitiator for use in the present invention is preferably selected from sulfonium salt compounds. This is preferred for the formation of a cured product with excellent curability.

Non-limiting examples of the cationic moiety in the sulfonium salt compounds include arylsulfonium ions such as triphenylsulfonium ion, diphenyl[4-(phenylthio)phenyl]sulfonium ion, tri-p-tolylsulfonium ion, (4-hydroxyphenyl)methylbenzylsulfonium ion, and 4-(4-biphenylylthio)phenyl-4-biphenylylphenylsulfonium ion, of which triarylsulfonium ions are typified.

Non-limiting examples of the anionic moiety include $[(Y)_s B(Phf)_{4-s}]^-$, where Y is selected from phenyl and biphenylyl, Phf represents phenyl with at least one selected from the group consisting of perfluoroalkyl, perfluoroalkoxy, and halogen replacing at least one of hydrogen atoms, and s is an integer of 0 to 3; $BF_4^-$; $[(Rf)_n PF_{6-n}]^-$, where Rf represents alkyl with fluorine atoms replacing 80% or more of hydrogen atoms, and n is an integer of 0 to 5; $AsF_6^-$, $SbF_6^-$, and pentafluorohydroxyantimonate.

Non-limiting examples of the cationic photoinitiator for use in the present invention include (4-hydroxyphenyl)methylbenzylsulfonium tetrakis(pentafluorophenyl)borate, 4-(4-biphenylylthio)phenyl-4-biphenylylphenylsulfonium tetrakis(pentafluorophenyl)borate, 4-(phenylthio)phenyldiphenylsulfonium phenyltris(pentafluorophenyl)borate, [4-(4-biphenylylthio)phenyl]-4-biphenylylphenylsulfonium phenyltris(pentafluorophenyl)borate, diphenyl[4-(phenylthio)phenyl]sulfonium tris(pentafluoroethyl)trifluorophosphate, diphenyl[4-(phenylthio)phenyl]sulfonium tetrakis(pentafluorophenyl)borate, diphenyl[4-(phenylthio)phenyl]sulfonium hexafluorophosphate, 4-(4-biphenylylthio)phenyl-4-biphenylylphenylsulfonium tris(pentafluoroethyl)trifluorophosphate, bis[4-(diphenylsulfonio)phenyl]sulfide phenyltris(pentafluorophenyl)borate, [4-(2-thioxanthonylthio)phenyl]phenyl-2-thioxanthonylsulfonium phenyltris(pentafluorophenyl)borate, 4-(phenylthio)phenyldiphenylsulfonium hexafluoroantimonate, as well as commercial products available typically under trade names CYRACURE UVI-6970, CYRACURE UVI-6974, CYRACURE UVI-6990, and CYRACURE UVI-950 (each supplied by Union Carbide Corporation, U.S.A.), IRGACURE 250, IRGACURE 261, IRGACURE 264 (each supplied by Ciba Specialty Chemicals Corporation), SP-150, SP-151, SP-170, and OPTOMER SP-171 (each supplied by ADEKA CORPORATION), CG-24-61 (supplied by Ciba Specialty Chemicals Corporation), DAICAT II (supplied by Daicel Corporation), UVAC1590 and UVAC1591 (each supplied by DAICEL-CYTEC Company, Ltd.), CI-2064, CI-2639, CI-2624, CI-2481, CI-2734, CI-2855, CI-2823, CI-2758, and CIT-1682 (each supplied by Nippon Soda Co., Ltd.), PI-2074 (supplied by Rhodia, (toluylcumyl)iodonium tetrakis(pentafluorophenyl)borate), FFC509 (supplied by 3M Corporation), BBI-102, BBI-101, BBI-103, MPI-103, TPS-103, MDS-103, DTS-103, NAT-103, and NDS-103 (each supplied by Midori Kagaku Co., Ltd.), CD-1010, CD-1011, and CD-1012 (each supplied by Sartomer Company, Inc., U.S.A.), CPI-100P, CPI-101A, and CPI-200K (each supplied by San-Apro Ltd.).

The "cationic thermal initiator" refers to a compound that generates a cationic species upon the application of heat to initiate a curing reaction of a cationically curable compound. The cationic thermal initiator includes a cationic moiety and an anionic moiety, where the cationic moiety absorbs heat, and the anionic moiety serves as an acid source.

Non-limiting examples of the cationic thermal initiator for use in the present invention include iodonium salt compounds and sulfonium salt compounds.

Non-limiting examples of the cationic moiety in the cationic thermal initiator include arylsulfonium ions such as 4-hydroxyphenyl-methyl-benzylsulfonium ion, 4-hydroxyphenyl-methyl-(2-methylbenzyl)sulfonium ion, 4-hydroxyphenyl-methyl-1-naphthylmethylsulfonium ion, and p-methoxycarbonyloxyphenyl-benzyl-methylsulfonium ion, of which monoarylsulfonium ions are typified.

The anionic moiety in the cationic thermal initiator is exemplified as with the anionic moiety in the cationic photoinitiator.

Non-limiting examples of the cationic thermal initiator include 4-hydroxyphenyl-methyl-benzylsulfonium phenyltris(pentafluorophenyl)borate, 4-hydroxyphenyl-methyl-(2-methylbenzyl)sulfonium phenyltris(pentafluorophenyl)borate, 4-hydroxyphenyl-methyl-1-naphthylmethylsulfonium phenyltris(pentafluorophenyl)borate, and p-methoxycarbonyloxyphenyl-benzyl-methylsulfonium phenyltris(pentafluorophenyl)borate.

The curable composition may contain each of different cationic-polymerization initiators alone or in combination. The curable composition may contain the cationic-polymerization initiator(s) in an amount (blending amount) of preferably 0.01 to 15 parts by weight, more preferably 0.01 to 10 parts by weight, furthermore preferably 0.05 to 10 parts by weight, and particularly preferably 0.1 to 5 parts by weight, per 100 parts by weight of the total amount of all cationically curable compounds (the total amount of cationically curable compounds such as epoxides and oxetane compounds) contained in the curable composition. The curable composition, when containing the cationic-polymerization initiator(s) in an amount within the range, gives a cured product having properties such as heat resistance and optical properties at excellent levels.

Polysiloxane (C)

The polysiloxane for use in the present invention is a compound represented by Formula (c) and has excellent leveling properties. The presence of the polysiloxane in the curable composition according to the present invention allows the curable composition to have better wettability with a mold and eliminates or minimizes the occurrence of "bubble entrapment" upon charging of the curable composition into the mold, without affecting curability of cationically curable compounds contained in the curable composition. The curable composition may contain each of different polysiloxanes alone or in combination. Formula (c) is expressed as follows:

[Chem. 6]

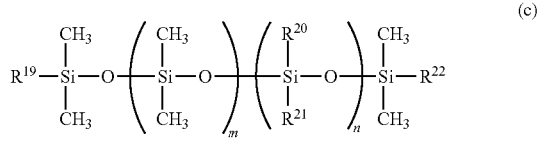

(c)

In Formula (c), $R^{19}$ to $R^{22}$ each represent, identically or differently in each occurrence, a group selected from hydrogen, alkyl, haloalkyl, aryl, aralkyl, alkoxy, acyloxy, and —RNHCOR', where R is selected from alkylene and alkenylene, and R' is selected from alkyl and alkenyl.

Non-limiting examples of the alkyl as $R^{19}$ to $R^{22}$ include $C_1$-$C_{20}$ alkyl such as methyl, ethyl, propyl, isopropyl, butyl, hexyl, octyl, isooctyl, decyl, and dodecyl, of which $C_1$-$C_{10}$ alkyl is preferred, and $C_1$-$C_4$ alkyl is particularly preferred.

Non-limiting examples of the haloalkyl as $R^{19}$ to $R^{22}$ include chloromethyl, trifluoromethyl, 2,2,2-trifluoroethyl, pentafluoroethyl, 3,3,3-trifluoropropyl, and other groups corresponding to the alkyl exemplified as the alkyl as $R^{19}$ to $R^{22}$, except with one or more halogen atoms replacing hydrogen atoms.

Non-limiting examples of the aryl as $R^{19}$ to $R^{22}$ include $C_6$-$C_{14}$ aryl such as phenyl and naphthyl, of which $C_6$-$C_{10}$ aryl is preferred.

Non-limiting examples of the aralkyl as $R^{19}$ to $R^{22}$ include $C_7$-$C_{18}$ aralkyl such as benzyl and phenethyl, of which $C_7$-$C_{10}$ aralkyl is preferred.

Non-limiting examples of the alkoxy as $R^{19}$ to $R^{22}$ include $C_1$-$C_{10}$ alkoxy such as methoxy, ethoxy, propoxy, isopropyloxy, butoxy, and isobutyloxy.

Non-limiting examples of the acyloxy as $R^{19}$ to $R^{22}$ include $C_1$-$C_{10}$ acyloxy such as acetyloxy, propionyloxy, (meth)acryloyloxy, and benzoyloxy.

R in the —RNHCOR' group is selected from alkylene and alkenylene and is exemplified by, but not limited to, straight or branched chain $C_1$-$C_{12}$ alkylene such as methylene, ethylene, methylethylene, trimethylene, 1-methyltrimethylene, 2-methyltrimethylene, 2,2-dimethyltrimethylene, tetramethylene, pentamethylene, hexamethylene, heptamethylene, octamethylene, nonamethylene, 2,2,4-trimethylhexamethylene, decamethylene, and dodecamethylene; and straight or branched chain $C_2$-$C_3$ alkenylene such as vinylene and propenylene.

R' in the —RNHCOR' group is selected from alkyl and alkenyl and is exemplified by, but not limited to, $C_1$-$C_{20}$ alkyl such as methyl, ethyl, propyl, isopropyl, butyl, hexyl, octyl, isooctyl, decyl, and dodecyl; and $C_2$-$C_{20}$ alkenyl such as vinyl, allyl, methallyl, 1-propenyl, isopropenyl, 1-butenyl, 2-butenyl, 3-butenyl, 1-pentenyl, 2-pentenyl, 3-pentenyl, 4-pentenyl, and 5-hexenyl.

In Formula (c), m and n each represent, identically or differently, an integer of 1 or more (e.g., an integer of 1 to 500).

The polysiloxane for use in the present invention may be selected from commercial products available typically under trade names BYK-UV3510 and BYK-307 (each supplied by BYK Japan KK), and trade name DISPARLON 1930N (supplied by Kusumoto Chemicals, Ltd.).

The curable composition contains the polysiloxane in a content of 0.01% to 5% by weight based on the total amount (100% by weight) of the curable composition. The content is preferably 0.05% to 4% by weight, and particularly preferably 0.1% to 3% by weight. The curable composition may contain the polysiloxane in a proportion of typically 0.01 to 5 parts by weight, preferably 0.05 to 4 parts by weight, and particularly preferably 0.1 to 3 parts by weight, per 100 parts by weight of all cationically curable compounds (the total amount of all cationically curable compounds such as epoxides and oxetane compounds) contained in the curable composition. The presence of the polysiloxane in a content (proportion) within the range allows the curable composition to have better wettability with a mold and eliminates or minimizes the occurrence of "bubble entrapment" upon charging of the curable composition into the mold.

Siloxane Compound (D)

The curable composition according to the present invention preferably further contains a siloxane compound (D) as a cationically curable compound in addition to the cycloaliphatic epoxide (A). The "siloxane compound (D)" refers to a compound having two or more epoxy groups per molecule and further having a siloxane skeleton including siloxane bond (Si—O—Si). The siloxane skeleton may be selected from cyclic siloxane skeletons, straight or branched chain silicones (straight chain or branched chain polysiloxanes), and cage-like or ladder-like polysilsesquioxanes. In particular, the siloxane compound (D) for use in the present invention is preferably a compound having a cyclic siloxane skeleton, because this configuration allows the curable composition to have excellent curability and to give a lens that has heat resistance and mechanical strength at excellent levels. Namely, the siloxane compound (D) is preferably a cyclic siloxane containing two or more epoxy groups per molecule.

When the siloxane compound (D) is a cyclic siloxane containing two or more epoxy groups, the number of Si—O units constituting the siloxane ring is preferably 2 to 12, and more preferably 4 to 8. This is preferred for the curable composition to have excellent curability and to give a lens that has heat resistance and mechanical strength at excellent levels. The number of Si—O units is equal to the number of silicon atoms constituting the siloxane ring.

The number of epoxy groups per molecule of the siloxane compound (D) is not limited, as long as being 2 or more, but preferably 2 to 4, and more preferably 3 or 4. This is preferred for the curable composition to have excellent curability and to give a lens that has heat resistance and mechanical strength at excellent levels.

The siloxane compound (D) has an epoxy equivalent (weight per epoxy equivalent) of preferably 150 to 400, more preferably 180 to 350, and furthermore preferably 180 to 300. This is preferred for the curable composition to have excellent curability and to give a lens that has heat resistance and mechanical strength at excellent levels. The epoxy equivalent is determined in conformity with JIS K 7236.

At least one of the epoxy groups in the siloxane compound (D) is preferably a cycloaliphatic epoxy group and is more preferably a cyclohexene oxide group. This is preferred for the curable composition to have excellent curability and to give a lens that has heat resistance and mechanical strength at excellent levels. The "cycloaliphatic epoxy group" refers to an epoxy group including an oxygen atom bonded in a triangular arrangement to two adjacent carbon atoms constituting an aliphatic ring. The "cyclohexene oxide group" refers to an epoxy group including an oxygen atom bonded in a triangular arrangement to two adjacent carbon atoms constituting a cyclohexane ring.

Non-limiting examples of the siloxane compound (D) include compounds (cyclic siloxanes) represented by Formula (d):

[Chem. 7]

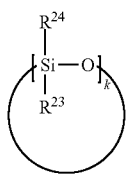
(d)

In Formula (d), $R^{23}$ and $R^{24}$ each represent, identically or differently in each occurrence, selected from a cycloaliphatic-epoxy-containing monovalent group and alkyl, where at least two of "k" occurrences of $R^{23}$ and "k" occurrences of $R^{24}$ in the compound represented by Formula (d) are each independently a cycloaliphatic-epoxy-containing monovalent group. The number k in Formula (d) represents an integer of 3 or more (and is preferably an integer of 3 to 6). The "k" occurrences of $R^{23}$ and the "k" occurrences of $R^{24}$ in the compound represented by Formula (d) may be identical or different.

A non-limiting examples of the cycloaliphatic-epoxy-containing monovalent group as $R^{23}$ and $R^{24}$ is -A-$R^{25}$, where "A" represents alkylene; and $R^{25}$ represents a cycloaliphatic epoxy group. Non-limiting examples of the alkylene as "A" include $C_1$-$C_{18}$ straight or branched chain alkylene such as methylene, methylmethylene, dimethylmethylene, ethylene, propylene, and trimethylene. A non-limiting example of the group $R^{25}$ is a cyclohexene oxide group.

Non-limiting examples of the alkyl as $R^{23}$ and $R^{24}$ include $C_1$-$C_{12}$ straight or branched chain alkyl.

Specifically, non-limiting examples of the siloxane compound (D) include 2,4-di[2-(3-{oxabicyclo[4.1.0]heptyl})ethyl]-2,4,6,6,8,8-hexamethyl-cyclotetrasiloxane, 4,8-di[2-(3-{oxabicyclo[4.1.0]heptyl})ethyl]-2,2,4,6,6,8-hexamethyl-cyclotetrasiloxane, 2,4-di[2-(3-{oxabicyclo[4.1.0]heptyl})ethyl]-6,8-dipropyl-2,4,6,8-tetramethyl-cyclotetrasiloxane, 4,8-di[2-(3-{oxabicyclo[4.1.0]heptyl})ethyl]-2,6-dipropyl-2,4,6,8-tetramethyl-cyclotetrasiloxane, 2,4,8-tri[2-(3-{oxabicyclo[4.1.0]heptyl})ethyl]-2,4,6,6,8-pentamethyl-cyclotetrasiloxane, 2,4,8-tri[2-(3-{oxabicyclo[4.1.0]heptyl})ethyl]-6-propyl-2,4,6,8-tetramethyl-cyclotetrasiloxane, 2,4,6,8-tetra[2-(3-{oxabicyclo[4.1.0]heptyl})ethyl]-2,4,6,8-tetramethyl-cyclotetrasiloxane, and epoxy-containing silsesquioxanes.

More specifically, non-limiting examples of the siloxane compound (D) include compounds represented by Formulae (d-1) to (d-7):

[Chem. 8]

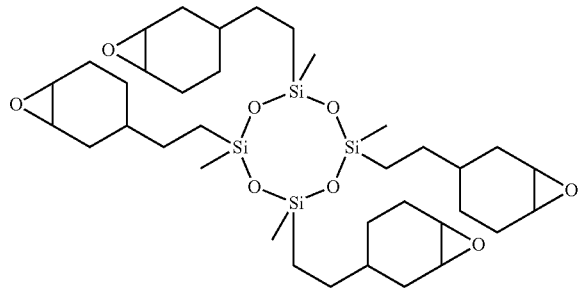
(d-1)

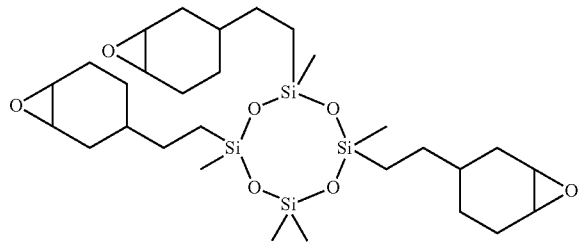
(d-2)

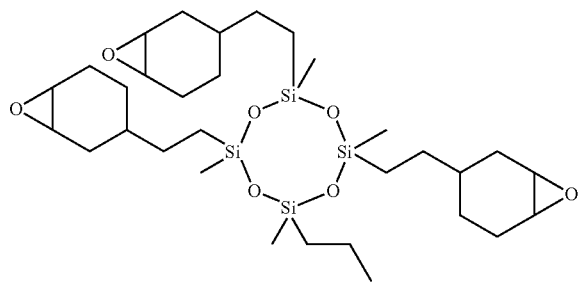
(d-3)

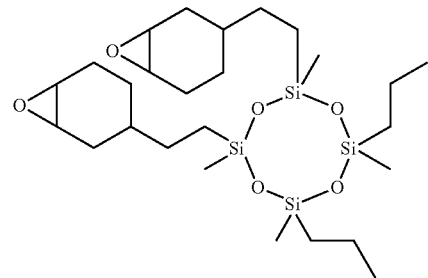
(d-4)

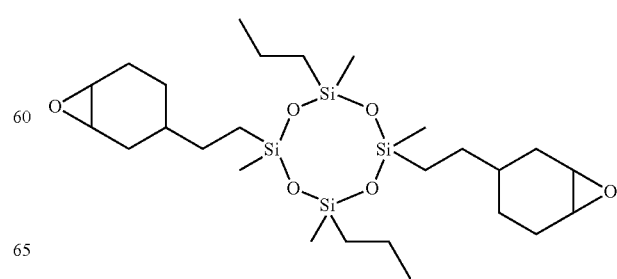
(d-5)

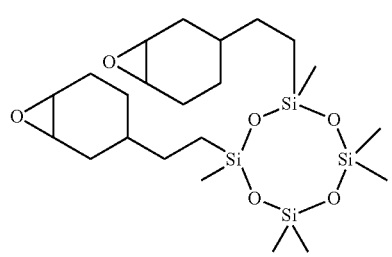

(d-6)

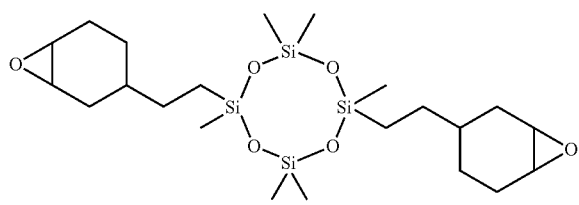

(d-7)

The siloxane compound (D) may also be selected from the cycloaliphatic-epoxy-containing silicone resins described in JP-A No. 2008-248169; and the organopolysilsesquioxane resins containing at least two epoxy functional groups per molecule, described in JP-A No. 2008-19422.

The curable composition according to the present invention may contain each of different siloxane compounds (D) alone or in combination. Such siloxane compounds (D) may also be selected from commercial products available typically under trade names X-40-2678, X-40-2670, and X-40-2720 (each supplied by Shin-Etsu Chemical Co., Ltd.).

The curable composition according to the present invention may contain the siloxane compound (D) in a content (blending amount) of preferably 1% to 50% by weight, more preferably 5% to 45% by weight, and furthermore preferably 10% to 40% by weight, based on the total amount (100% by weight) of the curable composition.

The curable composition according to the present invention may contain the siloxane compound (D) in a proportion (blending amount) of preferably 1% to 60% by weight, more preferably 5% to 55% by weight, and furthermore preferably 10% to 50% by weight, based on the total amount (100% by weight) of all cationically curable compounds (the total amount of all cationically curable compounds such as epoxides and oxetane compounds) contained in the curable composition. The curable composition, when containing the siloxane compound (D) in a content (proportion) within the range, effectively allows the resulting lens to have heat resistance and mechanical strength at higher levels.

Other Cationically Curable Compound (E)

The curable composition according to the present invention may further contain one or more other cationically curable compounds. The term "other cationically curable compound" refers to a cationically curable compound excluding the cycloaliphatic epoxies (A) and the siloxane compounds (D).

Non-limiting examples of the other cationically curable compounds include other epoxides; oxetane compounds; and vinyl ether compounds. The term "other epoxide" refers to a compound that contains one or more epoxy groups per molecule, but excludes the cycloaliphatic epoxies (A) and the siloxane compounds (D). The term "oxetane compound" refers to a compound that contains one or more oxetane groups per molecule. The term "vinyl ether compound" refers to a compound that contains one or more vinyl ether groups per molecule. The presence of the other cationically curable compound(s) may allow the curable composition according to the present invention to be controlled in viscosity so as to have better handleability and/or to less shrink upon curing in lens formation.

The other epoxides are exemplified by, but not limited to, compounds containing one or more glycidyl ether groups per molecule. Non-limiting examples of the compounds containing one or more glycidyl ether groups per molecule include aromatic glycidyl ether epoxides such as bisphenol-A epoxides, bisphenol-F epoxides, biphenol epoxides, phenol novolac epoxides, cresol novolac epoxides, cresol novolac epoxides of bisphenol-A, naphthalene epoxides, and epoxides derived from trisphenolmethane; hydrogenated glycidyl ether epoxides; glycidyl ester epoxides; and glycidylamine epoxides.

Non-limiting examples of the hydrogenated glycidyl ether epoxides include hydrogenated bisphenol-A epoxides (compounds derived from bisphenol-A epoxides via hydrogenation) such as 2,2-bis[4-(2,3-epoxypropoxy)cyclohexyl]propane, 2,2-bis[3,5-dimethyl-4-(2,3-epoxypropoxy)cyclohexyl]propane, and multimers of them; hydrogenated bisphenol-F epoxides (compounds derived from bisphenol-F epoxides via hydrogenation) such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, bis[3,5-dimethyl-4-(2,3-epoxypropoxy)cyclohexyl]methane, and multimers of them; hydrogenated biphenol epoxides; hydrogenated phenol novolac epoxides; hydrogenated cresol novolac epoxides; hydrogenated cresol novolac epoxides of bisphenol-A; hydrogenated naphthalene epoxides; and hydrogenated products of epoxides derived from trisphenolmethane. Commercial products available typically under trade name YX8000 (supplied by Mitsubishi Chemical Corporation) may be used herein.

Examples of the other epoxides also include compounds each containing an epoxy group directly bonded to an alicycle, such as a compound represented by Formula (e-1):

[Chem. 9]

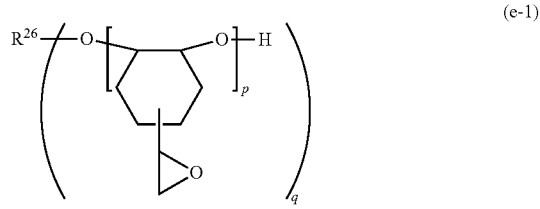

(e-1)

In Formula (e-1), $R^{26}$ represents a group corresponding to a "q"-hydric alcohol, except for removing —OH in the number of "q"; and p and q each independently represent a natural number. Non-limiting examples of the "q"-hydric alcohol ($R^{26}$—$(OH)_q$) include 2,2-bis(hydroxymethyl)-1-butanol and other polyhydric alcohols, of which $C_1$-$C_{15}$ alcohols are typified. The number q is preferably from 1 to 6, and the number p is preferably from 1 to 30. When q is 2 or more, two or more occurrences of p in two or more occurrences of the group in the parentheses (round brackets) may be identical or different. Specifically, non-limiting examples of the compound include 1,2-epoxy-4-(2-oxiranyl)cyclohexane adduct of 2,2-bis(hydroxymethyl)-1-butanol, trade name EHPE3150 (supplied by Daicel Corporation).

Non-limiting examples of the oxetane compounds include trimethylene oxide, 3,3-bis(vinyloxymethyl)oxetane, 3-ethyl-3-hydroxymethyloxetane, 3-ethyl-3-(2-ethylhexyloxymethyl)oxetane, 3-ethyl-3-(hydroxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis{[1-ethyl (3-oxetanyl)]methyl} ether, 4,4'-bis[(3-ethyl-3-oxetanyl)methoxymethyl]bicyclohexyl, 1,4-bis[(3-ethyl-3-oxetanyl)methoxymethyl]cyclohexane, and 3-ethyl-3-{[(3-ethyloxetan-3-yl)methoxy]methyl}oxetane. Commercial products available typically under trade names ARON OXETANE OXT221 and ARON OXETANE OXT101 (each supplied by Toagosei Co., Ltd.) may be used.

Non-limiting examples of the vinyl ether compounds include 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,4-cyclohexanedimethanol monovinyl ether, 1,3-cyclohexanedimethanol monovinyl ether, 1,2-cyclohexanedimethanol monovinyl ether, p-xylene glycol monovinyl ether, m-xylene glycol monovinyl ether, o-xylene glycol monovinyl ether, diethylene glycol monovinyl ether, triethylene glycol monovinyl ether, tetraethylene glycol monovinyl ether, pentaethylene glycol monovinyl ether, oligo(ethylene glycol) monovinyl ethers, poly(ethylene glycol) monovinyl ethers, dipropylene glycol monovinyl ether, tripropylene glycol monovinyl ether, tetrapropylene glycol monovinyl ether, pentapropylene glycol monovinyl ether, oligo(propylene glycol) monovinyl ethers, poly(propylene glycol) monovinyl ethers, and derivatives of them.

In particular, the other cationically curable compound (E) for use in the present invention is preferably at least one selected from the compounds containing one or more glycidyl ether groups per molecule (of which the hydrogenated glycidyl ether epoxides are more preferred) and the oxetane compounds.

The curable composition may contain the other cationically curable compound in a content (blending amount) of typically about 5% to about 60% by weight, preferably 10% to 60% by weight, and particularly preferably 20% to 50% by weight, based on the total amount (100% by weight) of the curable composition. When the curable composition contains two or more different other cationically curable compounds, the term "content" refers to the total content of them. The curable composition may contain the other cationically curable compound in a proportion (blending amount) of typically about 5% to about 60% by weight, preferably 10% to 60% by weight, and particularly preferably 20% to 50% by weight, based on the total amount (100% by weight) of all cationically curable compounds (the total amount of all cationically curable compounds such as epoxides and oxetane compounds) contained in the curable composition. When the curable composition contains two or more different other cationically curable compounds, the term "proportion" refers to the total proportion of them.

In an embodiment of the present invention, the curable composition preferably contains, as the other cationically curable compound, a compound containing one or more glycidyl ether groups per molecule (of which a hydrogenated glycidyl ether epoxide is more preferred). This is preferred for the curable composition to give a lens having still better mechanical strength. The curable composition preferably contains the compound containing one or more glycidyl ether groups per molecule (in particular, the hydrogenated glycidyl ether epoxide) in an amount of typically about 5% to about 60% by weight, more preferably 10% to 60% by weight, and particularly preferably 20% to 50% by weight, based on the total amount (100% by weight) of all cationically curable compounds (the total amount of all cationically curable compounds such as epoxides and oxetane compounds) contained in the curable composition.

In another embodiment of the present invention, the curable composition preferably contains, as the other cationically curable compound, an oxetane compound. This is preferred for the curable composition to have better curability (in particular, curability upon curing via ultraviolet irradiation). The curable composition preferably contains the oxetane compound in an amount of typically about 5% to about 30% by weight, more preferably 5% to 25% by weight, and particularly preferably 10% to 20% by weight, based on the total amount (100% by weight) of all cationically curable compounds (the total amount of all cationically curable compounds such as epoxides and oxetane compounds) contained in the curable composition.

Additives

The curable composition according to the present invention may further contain one or more other additives, in addition to the compounds. The additives may be selected from known or common additives and are exemplified by, but are not limited to, solvents, metal oxide particles, rubber particles, silicone- or fluorine-containing antifoaming agents, silane coupling agents, fillers, plasticizers, leveling agents excluding the polysiloxanes (C), antistatic agents, flame retardants, colorants, antioxidants, ultraviolet absorbers, ion adsorbents, pigments, and mold release agents. The content (blending amount) of these additives is preferably set to 5% by weight or less based on the total amount (100% by weight) of the curable composition. The curable composition according to the present invention may contain a solvent, but the amount of the solvent is preferably controlled to 10% by weight or less, and more preferably 1% by weight or less, based on the total amount (100% by weight) of the curable composition. This is because the curable composition, if containing an excessively large amount of the solvent, may cause the lens to include bubbles.

The colorants (or coloring matter) include pigments and dyes. The curable composition may contain each of different colorants alone or in combination.

Non-limiting examples of the pigments include inorganic pigments such as carbon black, chromium oxide, iron oxide, black titanium oxide, acetylene black, lamps black, bone black, graphite, iron black, copper-chromium black pigments, copper-iron-manganese black pigments, cobalt-iron-chromium black pigments, ruthenium oxide, graphite, fine particles of metals (e.g., aluminum), fine metal oxide particles, fine complex oxide particles, fine metal sulfide particles, and fine metal nitride particles; organic pigments such as perylene black, cyanine black, aniline black, azo pigments, anthraquinone pigments, isoindolinone pigments, indanthrene pigments, indigo pigments, quinacridone pigments, dioxazine pigments, tetraazaporphyrin pigments, triarylmethane pigments, phthalocyanine pigments, perylene pigments, benzimidazolone pigments, and rhodamine pigments; and pigments derived from inorganic pigments, except for being coated with organic materials such as resins.

Non-limiting examples of the dyes include azo dyes; anthraquinone dyes such as acid violet 39, acid violet 41, acid violet 42, acid violet 43, acid violet 48, acid violet 51, acid violet 34, acid violet 47, acid violet 109, acid violet 126, basic violet 24, basic violet 25, disperse violet 1, disperse violet 4, disperse violet 26, disperse violet 27, disperse violet 28, disperse violet 57, solvent violet 11, solvent violet 13, solvent violet 14, solvent violet 26, solvent violet 28, solvent violet 31, solvent violet 36, solvent violet 37, solvent violet 38, solvent violet 48, solvent violet 59, solvent violet 60, vat violet 13, vat violet 15, and vat violet 16; indigo dyes; carbonyl dyes; xanthene dyes; quinoneimine dyes; quinoline dyes; tetraazaporphyrin dyes; triarylmethane dyes; naphthoquinone dyes; nitro dyes; phthalocyanine dyes; fluoran dyes; perylene dyes; methine dyes; and rhodamine dyes.

The content of the colorant in the curable composition according to the present invention for lens formation may be adjusted as appropriate according to the intended use and is typically about 10 to 300 ppm based on the total amount of the curable composition for lens formation. The lower limit of the content is preferably 50 ppm, and particularly preferably 100 ppm. When the curable composition contains two or more different colorants, the term "content" refers to the total content of them.

The curable composition according to the present invention may be prepared typically by blending predetermined amounts of the cycloaliphatic epoxide (A), the cationic-polymerization initiator (B), and the polysiloxane (C), and optional components added as needed, such as the siloxane compound (D), the other cationically curable compound (E), and the additives, and mixing and stirring these components, where necessary with debubbling under vacuum. The stirring/mixing is preferably performed at a temperature of about 10° C. to about 60° C. The stirring/mixing may be performed using a known or common device. Such devices are exemplified by planetary centrifugal mixers, single- or multi-screw extruders, planetary mixers, kneaders, and dissolvers.

The curable composition according to the present invention has a viscosity of preferably 2000 mPa·s or less, more preferably 1000 mPa·s or less, and furthermore preferably 500 mPa·s or less, at a temperature of 25° C. and a rotation speed of 20 revolutions per second. Control of the viscosity of the curable composition according to the present invention within the range allows the curable composition to have better fluidity, to less suffer from remaining of bubbles, and to be charged into the lens-forming mold while restraining increase of injection pressure. Specifically, the control allows the curable composition according to the present invention to have better coatability and better chargeability and to offer better workability over the entire molding operation of the curable composition.

The curable composition according to the present invention has excellent wettability with a mold and has a contact angle of typically 50° or less, preferably 40° or less, particularly preferably less than 40°, and most preferably 35° or less, with a flat silicon substrate. This configuration eliminates or minimizes the occurrence of "bubble entrapment" upon charging of the curable composition into the mold. The contact angle of the curable composition may be measured by a sessile drop method and, more specifically, may be measured by the method described in working examples.

In addition, the curable composition according to the present invention has excellent curability and, by ultraviolet irradiation, forms a cured product having properties as mentioned below. This makes the curable composition advantageously usable as a material typically for wafer-level lenses, Fresnel lenses, lenses for camera flash, and any other lenses.

The cured product of the curable composition according to the present invention is hereinafter also referred to as a "cured product according to the present invention". The cured product according to the present invention has excellenL mechanical strength and still maintains a high glass transition temperature. The curing of the curable composition according to the present invention may be allowed to proceed typically by the method described in after-mentioned "lens production method".

The cured product according to the present invention has a transmittance (in terms of 0.5 mm thickness) of preferably 70% or more (e.g., 70% to 100%), more preferably 75% or more, furthermore preferably 80% or more, and particularly preferably 85% or more at 400 nm.

The cured product according to the present invention has a refractive index of preferably 1.40 to 1.60, and more preferably 1.48 to 1.58.

The cured product according to the present invention has an Abbe number of preferably 40 or more, and more preferably 50 or more.

The cured product according to the present invention has a glass transition temperature (Tg) of preferably 100° C. or higher (e.g., 100° C. to 200° C.), and more preferably 140° C. or higher. The cured product, if having a glass transition temperature of lower than 100° C., may have insufficient heat resistance in some usage modes. The glass transition temperature of the cured product may be measured typically by thermal analyses typically using a DSC (differential scanning calorimeter) or a TMA (thermomechanical analyzer), or by dynamic viscoelastic measurement. More specifically, the glass transition temperature may be measured by the measurement method described in the working examples.

The cured product according to the present invention has a linear expansion coefficient $\alpha 1$ of preferably 40 to 100 ppm/° C., and more preferably 40 to 90 ppm/° C. at temperatures equal to or lower than the glass transition temperature. The cured product according to the present invention has a linear expansion coefficient $\alpha 2$ of preferably 90 to 150 ppm/° C., and more preferably 90 to 140 ppm/° C. at temperatures equal to or higher than the glass transition temperature. The linear expansion coefficients $\alpha 1$ and $\alpha 2$ of the cured product may be measured typically using a TMA and, more specifically, may be measured by the measurement method described in the working examples.

The cured product according to the present invention has a storage modulus of preferably 0.1 GPa or more, and more preferably 1 GPa or more, at 25° C. The storage modulus of the cured product at 25° C. may be measured typically by the dynamic viscoelastic measurement and, more specifically, may be measured by the measurement method described in the working examples.

The cured product according to the present invention has excellent heat resistance. After subjected to three successive heat tests based on the reflow temperature profile (highest temperature: 270° C.) described in JEDEC Standards, the cured product has a transmittance at 400 nm of preferably 70% or more (e.g., 70% to 100%), more preferably 75% or more, furthermore preferably 80% or more, and particularly preferably 85% or more in terms of 0.5 mm thickness, and has a rate of yellowing of preferably 10% or less, and more preferably 5% or less. The transmittance and the rate of yellowing of the cured product may be measured by the measurement methods described in the working examples.

Lens Production Method

The method according to the present invention for lens production includes steps 1 and 2 as follows.

In the step 1, the curable composition for lens formation is charged into a lens-forming mold.

In the step 2, light is applied to the curable composition to cure the curable composition.

The lens-forming mold for use in molding is not limited in material, may be made of any of materials such as metals, glass, plastics, and silicon, but is preferably a silicon mold among them. The production method according to the present invention employs the curable composition for lens formation, where the curable composition has excellent wettability with the mold. This configuration restrains the occurrence of "bubble entrapment" upon charging of the curable composition into the mold and enables the production of a lens with excellent transfer accuracy.

The charging of the curable composition for lens formation into the lens-forming mold may be performed by a technique such as cast molding or injection molding. The charging in the step 1, when using cast molding, may be performed by bringing the curable composition according to the present invention into contact with the lens-forming mold. The charging in the step 1, when using injection molding, may be performed by injecting the curable composition according to the present invention into the lens-forming mold.

As the lens-forming mold in the step 1, the use of a mold for wafer-level lens molding gives a wafer-level lens, and the use of a mold for Fresnel lens molding gives a Fresnel lens. The production method according to the present invention employs the curable composition for lens formation having excellent wettability with a mold and enables the production of a lens with excellent transfer accuracy even when the mold for use herein is a mold for molding of wafer-level lenses and other lenses reduced in size, weight, and/or thickness or for molding of Fresnel lenses and other specially-shaped lenses.

The light application in the step 2 may be performed using a light source within such a range that the cumulative dose is typically 500 to 5000 mJ/cm$^2$. Non-limiting examples of the light source include mercury lamps, xenon lamps, carbon arc lamps, metal halide lamps, sunlight, electron beam sources, laser sources, and LED light sources. In the present invention, the use of a single-wavelength light source such as an LED light source (e.g., a UV-LED at a wavelength of 350 to 450 nm) enables the production of a lens that has high transparency and excellent optical properties.

The step 2 may further include annealing after the light application. The annealing may be performed typically by heating at a temperature of about 100° C. to about 200° C. for about 30 minutes to 1 hour. The annealing may be performed after demolding the workpiece from the lens-forming mold, or without demolding. The cured product of the curable composition according to the present invention has excellent heat resistance and satisfactorily retains its shape even in a high-temperature environment at a temperature of about 100° C. to about 200° C. Thus, the workpiece, even when being annealed after demolding from the lens-forming mold, does not approximately suffer from deviations in lens pitch, and this enables efficient production of lenses having excellent lens center alignment accuracy.

Assume that the step 1 is performed according to a simultaneous molding technique, in which a lens-forming mold having two or more lens patterns is used as the lens-forming mold. In this case, the workpiece after the step 1 is subjected to the step 2 to give a coupled lens assembly including two or more lenses coupled to each other. In this case, the resulting coupled lens assembly is cut, from which margins are eliminated as needed, to give lenses.

The lens patterns in the lens-forming mold having two or more lens patterns may be arranged (aligned) regularly or may be disposed at random.

The cutting of the coupled lens assembly may be performed typically by a known or common processing procedure. The coupled lens assembly may be cut one by one, or may be cut as a laminate including two or more coupled lens assemblies as stacked. The lens obtained by the lens production method according to the present invention has excellent transfer accuracy from the mold. Thus, when two or more plies of the coupled lens assembly are stacked and are cut while cutting line positions are determined based on the uppermost coupled lens assembly, multiple lenses can be separated without failure (breakage). This enables cost reduction and working efficiency enhancement.

Non-limiting examples of the lens according to the present invention produced by the production method include wafer-level lenses, Fresnel lenses, lenses for camera flash, and coupled lens assemblies each including two or more of these lenses coupled to each other, as well as lens stacks. The term "lens stack" refers to a multilayer lens assembly including two or more (e.g., two to five, and in particular two or three) plies of the lens, or refers to a multilayer coupled lens assembly including two or more (e.g., two to five, and in particular two or three) plies of the coupled lens assembly.

The lens stack may be produced by known or common methods. For example, the lens stack may be produced by stacking cut lenses. Alternatively, the lens stack may be produced by staking two or more coupled lens assemblies including at least one ply of the coupled lens assembly produced by the simultaneous molding technique to give a multilayer coupled lens assembly (laminate of coupled lens assemblies), and cutting the multilayer coupled lens assembly. The individual layers in the lens stack according to the present invention may be bonded or joined to each other via a known or common bonding means, or not. The stacking of two or more lenses gives a dramatically increased number of pixels.

The lens according to the present invention has excellent heat resistance and excellent optical properties, can satisfactorily retain its shape, and can maintain excellent optical properties even exposed to a high-temperature environment, as described on the cured product according to the present invention. Thus, the lens is preferably usable typically as imaging lenses in cameras in various optical devices, spectacle lenses, light-beam condenser lenses, and light-diffusing lenses. Non-limiting examples of the cameras include car-mounted cameras, digital cameras, cameras for personal computers, cameras for cellular phones, and security cameras. The optical devices, which include (are equipped with) the lens according to the present invention or the lens stack including the lens according to the present invention as a constitutional element, have high quality.

The lens according to the present invention can be mounted to a circuit board by a solder reflow process. A camera module including the lens according to the present invention can be very efficiently mounted directly onto a printed circuit board (PCB) typically of a cellular phone by the same solder reflow process as with surface mounting of other electronic components. This enables extremely efficient production of the optical devices.

EXAMPLES

The present invention will be illustrated in further detail with reference to several examples below. It should be noted, however, that the examples are by no means intended to limit the scope of the present invention.

Preparation Example 1: Preparation of Cycloaliphatic Epoxide (a-1)

A dehydration catalyst was prepared by mixing and stirring 70 g (0.68 mol) of 95% by weight sulfuric acid and 55 g (0.36 mol) of 1,8-diazabicyclo[5.4.0]undecene-7 (DBU).

Into a 3-liter flask, 1000 g (5.05 mol) of hydrogenated biphenol (i.e., 4,4'-dihydroxybicyclohexyl), 125 g (0.68 mol in terms of sulfuric acid) of the above-prepared dehydration catalyst, and 1500 g of pseudocumene, followed by heating of the flask, where the flask was equipped with a stirrer, a thermometer, and a distillation pipe equipped with a dehydration tube and thermally insulated. Water production was observed around at the time point when the internal temperature exceeded 115° C. The temperature rise was continued up to the boiling point of pseudocumene (to an internal temperature of 162° C. to 170° C.), and a dehydration reaction was performed under normal atmospheric pressure. The by-produced water was distilled and discharged via the dehydration tube out of the system. The dehydration catalyst was liquid under the reaction conditions and was finely dispersed in the reaction mixture. Approximately an stoichiometric amount of water (180 g) was distilled after a lapse of 3 hours, and this was defined as reaction completion. The reaction mixture after reaction completion was subjected to distillation using an Oldershaw distilling column including 10 plates to distill off pseudocumene, was further subjected to distillation at an internal temperature of 137° C. to 140° C. and an internal pressure of 10 Torr (1.33 kPa), and yielded 731 g of bicyclohexyl-3,3'-diene.

Into a reactor, 243 g of the prepared bicyclohexyl-3,3'-diene and 730 g of ethyl acetate were charged. The resulting mixture was combined with 274 g of a 30% by weight solution (moisture content: 0.41% by weight) of peracetic acid in ethyl acetate, where the solution was added dropwise over about 3 hours while blowing nitrogen into the gas phase portion and controlling the temperature in the reaction system at 37.5° C. After the completion of dropwise addition, the mixture was aged at 40° C. for 1 hour, and the reaction was completed. Further, the crude mixture obtained upon reaction completion was washed with water at 30° C., from which low-boiling compounds were removed at 70° C. and 20 mmHg, and yielded 270 g of a cycloaliphatic epoxide. The prepared cycloaliphatic epoxide had an oxirane oxygen content of 15.0% by weight. The cycloaliphatic epoxide was also subjected to $^1$H-NMR measurement to find that a peak at a δ of about 4.5 to about 5 ppm assigned to an internal double bond disappeared, but a peak at a δ of about 3.1 ppm assigned to an epoxy-derived proton appeared. Thus, the prepared cycloaliphatic epoxide was identified as (3,4,3',4'-diepoxy)bicyclohexyl.

Preparation Example 2: Preparation of Cycloaliphatic Epoxide (a-2)

Into a 5-L reactor, sodium hydroxide (granular) (499 g, 12.48 mol) and toluene (727 mL) were charged. After nitrogen purging, the resulting mixture was combined with a solution of tetrahydrobenzyl alcohol (420 g, 3.74 mol) in toluene (484 mL), followed by aging at 70° C. for 1.5 hours. Next, the mixture was further combined with tetrahydrobenzyl methanesulfonate (419 g, 2.20 mol), aged under reflux for 3 hours, cooled down to room temperature, and combined with water (1248 g) to quench the reaction. An organic layer was separated, concentrated, subjected to distillation under reduced pressure, and yielded ditetrahydrobenzyl ether as a colorless, transparent liquid in a yield of 85%. The prepared ditetrahydrobenzyl ether was subjected to $^1$H-NMR spectrum measurement.

$^1$H-NMR (CDCl$_3$): δ 1.23-1.33 (m, 2H), 1.68-1.94 (m, 6H), 2.02-2.15 (m, 6H), 3.26-3.34 (m, 4H), 5.63-7.70 (m, 4H)

The prepared ditetrahydrobenzyl ether (200 g, 0.97 mol), 20% SP-D (acetic acid solution) (0.39 g), and ethyl acetate (669 mL) were charged into a reactor, followed by temperature rise up to 40° C. Next, the resulting mixture was combined with 29.1% peracetic acid (608 g) added dropwise over 5 hours, followed by aging for 3 hours. The resulting organic layer was washed with an alkaline aqueous solution three times and with ion-exchanged water two times, subjected to distillation under reduced pressure, and yielded bis(3,4-epoxycyclohexylmethyl) ether as a colorless, transparent liquid in a yield of 77%.

Preparation Example 3: Preparation of Cycloaliphatic Epoxide (a-3)

In a 1-liter jacketed flask equipped with a stirrer, a condenser, a thermometer, and a nitrogen inlet tube, 36 g of water, 12.0 g of sodium hydrogensulfate, 500 g of isopropylidene-4,4'-dicyclohexanol (supplied by Sigma-Aldrich), and 500 g of Solvesso 150 (supplied by Exxon Mobile Corporation) as a solvent were placed, followed by a dehydration reaction at 100° C. The reaction was completed at the time point when water was ceased to be distilled. The reaction mixture was analyzed by gas chromatography to find that 2,2-bis(3-cyclohexen-1-yl)propane was formed in a yield of 96%. The reaction mixture was washed with 500 ml of ion-exchanged water using a separatory funnel, of which the organic layer was subjected to distillation under reduced pressure, and yielded 387.0 g of 2,2-bis(3-cyclohexen-1-yl)propane as a colorless, transparent liquid with a purity of 96.1%.

Into a 1-liter jacketed flask as above, 100 g of the prepared 2,2-bis(3-cyclohexen-1-yl)propane and 30 g of ethyl acetate were charged. The resulting mixture was combined with 307.2 g of an approximately anhydrous solution (having a peracetic acid concentration of 29.1% and a moisture content of 0.47%) of peracetic acid in ethyl acetate added dropwise over about 2 hours in such a manner that the temperature in the reaction system was kept at 30° C., while blowing nitrogen into the gas phase portion. After the completion of dropwise addition, the mixture was aged at 30° C. for 3 hours, and the reaction was completed. Further, the reaction mixture obtained upon reaction completion was washed with water at 30° C., from which low-boiling components were removed at 70° C. and 20 mmHg, and yielded 99.4 g of 2,2-bis(3,4-epoxycyclohex-1-yl)propane. The prepared product had, as properties, an oxirane oxygen content of 11.3% and a viscosity of 3550 cP (25° C.). The $^1$H-NMR spectrum of the product demonstrated that a peak at a δ of about 4.5 to about 5 ppm assigned to an internal double bond disappeared, but a peak at a δ of about 2.9 to about 3.1 ppm assigned to an epoxy-derived proton appeared.

Examples 1 to 8 and Comparative Examples 1 to 3

Components as given in Table 1 below were blended according to the formulations (in part by weight), stirred and mixed at room temperature using a planetary centrifugal mixer, and yielded uniform, transparent curable compositions for lens formation.

b-1: 4-(phenylthio)phenyldiphenylsulfonium phenyltris(pentafluorophenyl)borate
Leveling Agents

TABLE 1

| | | | Examples | | | | | | | | Comparative Examples | | |
|---|---|---|---|---|---|---|---|---|---|---|---|---|---|
| | | | 1 | 2 | 3 | 4 | 5 | 6 | 7 | 8 | 1 | 2 | 3 |
| Cationically curable compound | Cycloaliphatic epoxide (A) | (a-1) | 40 | 30 | 30 | | | 30 | 35 | 30 | | 40 | 40 |
| | | (a-2) | | | | 30 | | | | | | | |
| | | (a-3) | | | | | 30 | | | | | | |
| | Siloxane compound (D) | (d-1) | 25 | 20 | 20 | 20 | 20 | 20 | 25 | 20 | 30 | 25 | 25 |
| | Other cationically curable compound (E) | YX8000 | 35 | 35 | 35 | 35 | 35 | 35 | 35 | 35 | 50 | 35 | 35 |
| | | OXT-221 | | 15 | 15 | 15 | 15 | 15 | | 15 | 20 | | |
| | | OXT-101 | | | | | | | 5 | | | | |
| Cationic photoinitiator (B) | | CPI-101A | 0.45 | 0.45 | 0.45 | 0.45 | 0.45 | 0.45 | 0.45 | | 0.45 | 0.45 | 0.45 |
| | | b-1 | | | | | | | | 0.5 | | | |
| Leveling agent | | BYK-UV3510 | | 0.5 | | 0.5 | 0.5 | 1 | 0.5 | 0.5 | | | |
| | | BYK-307 | 0.5 | | 0.5 | | | | | | 0.5 | | |
| | | F477 | | | | | | | | | | 0.5 | |
| Other additives | | IN1010 | 1 | 1 | 1 | 1 | 1 | 1 | 1 | 1 | 1 | 1 | 1 |
| | | HP-10 | 1 | 1 | 1 | 1 | 1 | 1 | 1 | 1 | 1 | 1 | 1 |

The abbreviations in Table 1 will be described. Cationically Curable Compounds

Cycloaliphatic Epoxides (A)

a-1: the compound prepared in Preparation Example 1 ((3,4,3',4'-diepoxy)bicyclohexyl)

a-2: the compound prepared in Preparation Example 2 (bis(3,4-epoxycyclohexylmethyl) ether)

a-3: the compound prepared in Preparation Example 3 (2,2-bis(3,4-epoxycyclohex-1-yl)propane)

Siloxane Compounds (D)

d-1: the cyclic siloxane represented by Formula (d-1) below (trade name X-40-2670, supplied by Shin-Etsu Chemical Co., Ltd., epoxy equivalent: 200)

[Chem. 10]

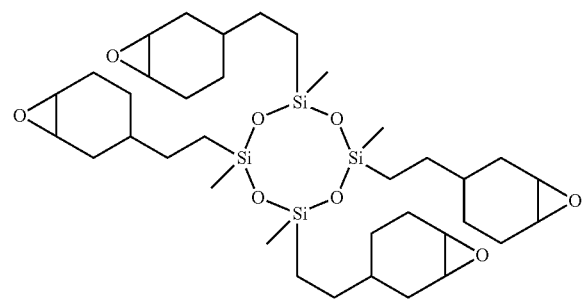

(d-1)

Other Cationically Curable Compounds (E)

YX8000: a non-ester hydrogenated bisphenol diglycidyl compound (trade name YX8000, supplied by Mitsubishi Chemical Corporation)

OXT-221: 3-ethyl-3{[(3-ethyloxetan-3-yl)methoxy]methyl}oxetane (trade name ARON OXETANE OXT221, supplied by Toagosei Co., Ltd.)

OXT-101: 3-ethyl-3-hydroxymethyloxetane (trade name ARON OXETANE OXT101, supplied by Toagosei Co., Lt.)

Cationic-Polymerization Initiators (B)

CPI-101A: an aromatic sulfonium salt (4-(phenylthio)phenyldiphenylsulfonium hexafluoroantimonate, trade name CPI-101A, supplied by San-Apro Ltd.)

Polysiloxanes (C)

BYK-UV3510: a mixture of a polyether-modified polydimethylsiloxane and a polyether, trade name BYK-UV3510, supplied by BYK Japan KK BYK-307: a mixture of a polyether-modified polydimethylsiloxane and a polyether, trade name BYK-307, supplied by BYK Japan KK Fluorine-Containing Leveling Agents F477: an oligomer containing a fluorine-containing group, a hydrophilic group, and a lipophilic group, trade name Megafac F477, supplied by DIC Corporation Antioxidants IN1010: pentaerythritoltetrakis[3-(3,5-di-t-butyl-4-hydroxyphenol) propionate], trade name IRGANOX 1010, supplied by BASF SE HP-10: 2,2'-methylenebis(4,6-di-t-butylphenyl)octyl phosphite, trade name HP-10, supplied by ADEKA CORPORATION The curable compositions for lens formation prepared in the examples and the comparative examples were subjected to evaluations as follows.

Wettability with Mold

Viscosity

The viscosity (mPa·s) of each of the curable compositions for lens formation prepared in the examples and the comparative examples was measured using a rheometer (trade name MCR301, supplied by Anton Paar Japan K.K.) at a temperature of 25° C. and a rotation speed of 20 revolutions per second.

Contact Angle

Each of the curable compositions for lens formation prepared in the examples and the comparative examples was set in a contact angle meter (trade name Dropmaster 700, supplied by Kyowa Interface Science Co., Ltd.), 4 to 5 μL of the curable composition was dropped onto a flat silicon substrate, and a contact angle (in degree (°)) was measured one minute later by the sessile drop method. The silicon substrate used herein was one prepared by curing trade name KE-1606 (supplied by Shin-Etsu Chemical Co., Ltd.) at 40° C. for 6 hours and heating the resulting article at 150° C. for 30 minutes.

Number of Bubbles

There was prepared a silicon mold for a Fresnel lens illustrated in FIG. 1. The target Fresnel lens had a diameter of 4 mm and an interval between the top of peaks 1 and the bottom of valleys 2 in FIG. 1(a) of 300 μm. Each of the curable compositions for lens formation prepared in the examples and the comparative examples was applied to the silicon mold and was irradiated with, and cured by, light at an irradiation intensity of 50 to 100 mW/cm and a cumulative dose of 2500 to 5000 mJ/cm² using an ultraviolet irradiator (trade name ZUV-C20H, supplied by OMRON Corporation). The sample after curing was observed with a CCD camera to count bubbles in the valleys 2 (FIG. 1(a)). The silicon mold used herein was one prepared by curing trade name KE-1606 (supplied by Shin-Etsu Chemical Co., Ltd.) at 40° C. for 6 hours and heating the resulting article at 150° C. for 30 minutes.

Curability

Each of the curable compositions for lens formation prepared in the examples and the comparative examples was evaluated on reaction rate (curability) by measuring viscoelastic behavior upon ultraviolet irradiation. The measurement was performed using a viscoelasticity measuring apparatus (rheometer) (trade name MCR301, supplied by Anton Paar Japan K.K.) and an ultraviolet irradiator (trade name LC8, supplied by Hamamatsu Photonics K.K.). Specifically, the time (in second) elapsed after the ultraviolet irradiation start (the time from the ultraviolet irradiation start and before the storage modulus reached $1\times10^4$ Pa) was measured, while the point at which the storage modulus reached $1\times10^4$ Pa was taken as an index for the gel point. The analysis with the rheometer was performed under conditions as follows:

Measurement Mode: oscillating mode
Measurement Plate Shape: parallel (12 mm in diameter)
Measurement Temperature: 25° C.
Measurement Frequency: 1 Hz
Measurement Strain: 0.1%

Each of the curable compositions for lens formation prepared in the examples and the comparative examples was cured by an ultraviolet irradiation method as follows and yielded a cured product.

Ultraviolet Irradiation Method

The curable composition for lens formation was applied to one of a pair of molds at 25° C., and a spacer having a predetermined thickness (0.5 mm) was then held between the pair of molds, followed by ultraviolet irradiation at an irradiation intensity of 50 to 100 mW/cm and a cumulative dose of 2500 to 5000 mJ/cm² using an UV irradiator (trade name 365 nm LED Unit, supplied by Ushio Inc.).

The resulting article was demolded from the molds, heated in an oven for 30 minutes to be annealed, where the oven had been preheated to 150° C., and yielded cured products (five cured products for each curable composition).

The cured products of the curable compositions for lens formation prepared in the examples and the comparative examples were evaluated as follows.

Mechanical Properties

Glass Transition Temperature: Tg

The glass transition temperature of each of the cured products of the curable compositions for lens formation prepared in the examples and the comparative examples was measured using a differential scanning calorimeter (trade name Q2000, supplied by TA Instruments) in the following manner. Specifically, the cured product was subjected to a pretreatment in which the temperature was raised from −50° C. up to 250° C. at a rate of 20° C./min and subsequently lowered from 250° C. down to −50° C. at a rate of −20° C./min. The glass transition temperature of the cured product after the pretreatment was measured in a nitrogen stream at measurement temperatures in the range of −50° C. to 250° C. at a rate of temperature rise of 20° C./min.

Linear Expansion Coefficient

The linear expansion coefficients of each of the cured products of the curable compositions for lens formation prepared in the examples and the comparative examples were determined in the following manner. The coefficients of thermal expansion were measured at measurement temperatures in the range of 30° C. to 250° C. at a rate of temperature rise of 5° C./min using a thermomechanical analyzer (TMA) (trade name TMA/SS100, supplied by SII NanoTechnology Inc.). A slope at a low temperature side was defined as a linear expansion coefficient. A linear expansion coefficient (ppm/° C.) at temperatures equal to or lower than the glass transition temperature was defined as the linear expansion coefficient α1. A linear expansion coefficient (ppm/° C.) at temperatures equal to or higher than the glass transition temperature was defined as the linear expansion coefficient α2.

Storage Modulus

The storage modulus (GPa) at 25° C. of each of the cured products of the curable compositions for lens formation prepared in the examples and the comparative examples was measured by a dynamic viscoelastic measurement method in conformity with JIS K 7224-1 to JIS K 7224-7, under measurement conditions as follows.

Measuring Apparatus: solids viscoelasticity analyzer (RSA-III, supplied by TA Instruments)
Atmosphere: nitrogen
Temperature Range: −30° C. to 270° C.
Rate of Temperature Rise: 5° C./min Optical Properties Transmittance The transmittance (transmittance before heat tests) of each of the cured products of the curable compositions for lens formation prepared in the examples and the comparative examples was measured.

Specifically, the light transmittance at 400 nm was measured using a spectrophotometer (trade name U-3900, supplied by Hitachi High-Technologies Corporation).

Refractive Index

The refractive index of each of the cured products of the curable compositions for lens formation prepared in the examples and the comparative examples was measured with respect to light at a wavelength of 589 nm. The measurement was performed at 25° C. by a method in conformity with JIS K 7142, using a refractometer (trade name Model 2010, supplied by Metricon Corporation).

Abbe Number

The Abbe number of each of the cured products of the curable compositions for lens formation prepared in the examples and the comparative examples was determined by calculation according to the equation:

$$\text{Abbe number}=(nd-1)/(nf-nc)$$

where nd represents a refractive index with respect to light at a wavelength of 589.2 nm; of represents a refractive index with respect to light at a wavelength of 486.1 nm; and nc represents a refractive index with respect to light at a wavelength of 656.3 nm. The refractive indices were refractive indices with respect to light at the wavelengths, as measured by the method mentioned above.

Rate of Yellowing

Each of the cured products of the curable compositions for lens formation prepared in the examples and the comparative examples was subjected to three successive heat tests based on the reflow temperature profile (highest temperature: 270° C.) described in JEDEC Standards, using a table-top reflow oven supplied by SHINAPEX CO., LTD. Thereafter the light transmittance at 400 nm (transmittance after heat tests) was measured by the above-mentioned method, based on which the rate of yellowing (%) was calculated according to the equation:

Rate of yellowing (%)={(Transmittance before heat tests)−(Transmittance after heat tests)}/(Transmittance before heat tests)×100

Results of the evaluations are summarized in Table 2.

TABLE 2

| | | Examples | | | | | |
|---|---|---|---|---|---|---|---|
| | Evaluation points | 1 | 2 | 3 | 4 | 5 | 6 |
| Wettability with mold | Viscosity (mPa · s) | 395 | 220 | 223 | 280 | 390 | 225 |
| | Contact angle (degree) | 35 | 25 | 34 | 26 | 30 | 21 |
| | Number of bubbles | 0 | 0 | 0 | 0 | 0 | 0 |
| Curability | Time (sec) elapsed before storage modulus reached 1 × 10⁴ Pa | 30 | 15 | 16 | 15 | 16 | 17 |
| Mechanical properties | Tg | 159 | 140 | 145 | 117 | 116 | 141 |
| | Linear expansion coefficient α1 | 86 | 78 | 80 | 80 | 83 | 82 |
| | Linear expansion coefficient α2 | 125 | 125 | 119 | 117 | 122 | 123 |
| | Storage modulus (GPa) | 2.3 | 2.2 | 2.3 | 2.0 | 2.2 | 2.2 |
| Cured resin before heat tests | Transmittance (%) at 400 nm | 90.0 | 90.6 | 90.1 | 89.4 | 89.2 | 90.4 |
| | Refractive index | 1.5146 | 1.5102 | 1.5093 | 1.5075 | 1.5083 | 1.5098 |
| | Abbe number | 56 | 57 | 56 | 56 | 55 | 56 |
| Cured resin after heat tests | Transmittance (%) at 400 nm | 89.7 | 90.5 | 90.0 | 89.3 | 89.0 | 90.3 |
| | Rate of yellowing (%) | 0.3 | 0.1 | 0.1 | 0.1 | 0.2 | 0.1 |

| | | Examples | | Comparative Examples | | |
|---|---|---|---|---|---|---|
| | Evaluation points | 7 | 8 | 1 | 2 | 3 |
| Wettability with mold | Viscosity (mPa · s) | 282 | 210 | 526 | 221 | 218 |
| | Contact angle (degree) | 27 | 25 | 40 | 45 | 50 |
| | Number of bubbles | 0 | 0 | 10 | 7 | 10 |
| Curability | Time (sec) elapsed before storage modulus reached 1 × 10⁴ Pa | 20 | 16 | 30 | 17 | 18 |
| Mechanical properties | Tg | 149 | 150-160 | 89 | 140 | 150 |
| | Linear expansion coefficient α1 | 87 | 90 | 98 | 80 | 79 |
| | Linear expansion coefficient α2 | 128 | 134 | 176 | 124 | 121 |
| | Storage modulus (GPa) | 2.2 | 2.0 | 2.0 | 2.3 | 2.3 |
| Cured resin before heat tests | Transmittance (%) at 400 nm | 90.7 | 90.2 | 89.9 | 89.5 | 89.1 |
| | Refractive index | 1.5131 | 1.5164 | 1.5057 | 1.5139 | 1.5148 |
| | Abbe number | 56 | 57 | 56 | 56 | 56 |
| Cured resin after heat tests | Transmittance (%) at 400 nm | 90.5 | 88.4 | 89.5 | 89.4 | 89.1 |
| | Rate of yellowing (%) | 0.2 | 1.8 | 0.4 | 0.1 | 0.0 |

INDUSTRIAL APPLICABILITY

The curable composition according to the present invention for lens formation has excellent wettability with a mold. This eliminates or minimizes the occurrence of "bubble entrapment" upon charging of the curable composition into the mold. In addition, the curable composition has excellent curability and can give a cured product that has heat resistance and optical properties at excellent levels. The use of the curable composition according to the present invention for lens formation gives a lens that has excellent transfer accuracy from the mold and offers heat resistance and optical properties at excellent levels. Thus, the curable composition is advantageously usable in uses for the production of wafer-level lenses and other lenses reduced in size, weight, and/or thickness, and Fresnel lenses and other specially-shaped lenses, where the production is performed using a mold.

REFERENCE SIGNS LIST 1 peak in sawtooth cross section of Fresnel lens
2 valley in sawtooth cross section of Fresnel lens

The invention claimed is:

1. A curable composition for lens formation, the curable composition comprising:
a cycloaliphatic epoxide (A) being at least one compound selected from the group consisting of (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, and 1,2-bis(3,4-epoxycyclohex-1-yl)ethane;
a cationic-polymerization initiator (B);
a polysiloxane (C) represented by Formula (c),
a siloxane compound (D) being at least one selected from the group consisting of compounds represented by Formulae (d-1) to (d-7), and
an oxetane compound;
the curable composition containing the cycloaliphatic epoxide (A) in a content of 20% to 40% by weight, the polysiloxane (C) in an amount of 0.01% to 5% by weight, and the oxetane compound in a content of 5% to 30% by weight, each based on the total amount of all cationically curable compounds, Formulae (c) and (d-1) to (d-7) expressed as follows:

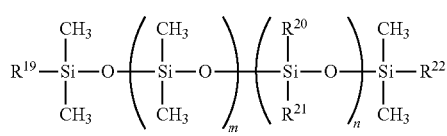

(c)

wherein:
R$^{19}$ to R$^{22}$ each represent, identically or differently in each occurrence, a group selected from hydrogen, alkyl, haloalkyl, aryl, aralkyl, alkoxy, acyloxy, and —RNH-COR', where R is selected from alkylene and alkenylene, and R' is selected from alkyl and alkenyl; and m and n each represent, identically or differently, an integer of 1 or more,

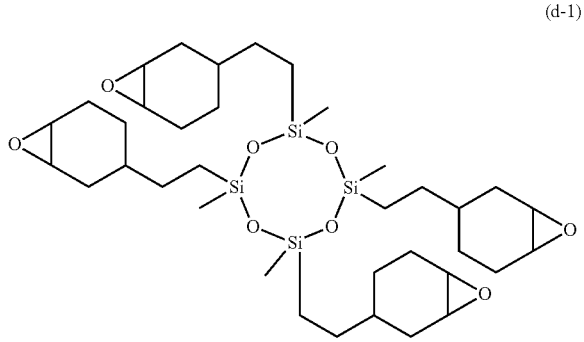
(d-1)

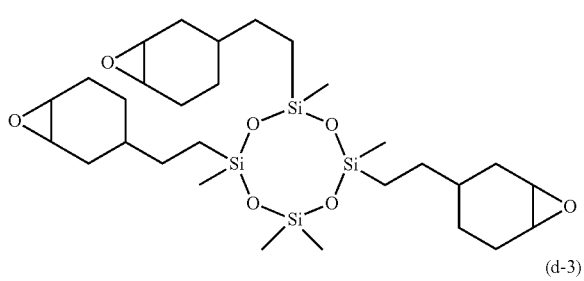
(d-2)

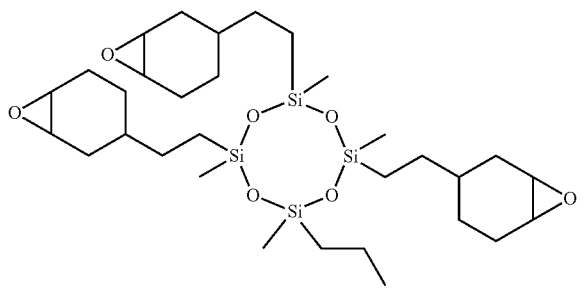
(d-3)

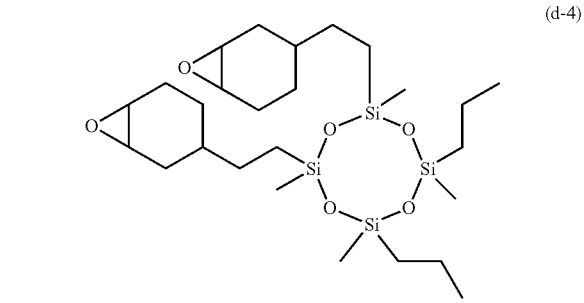
(d-4)

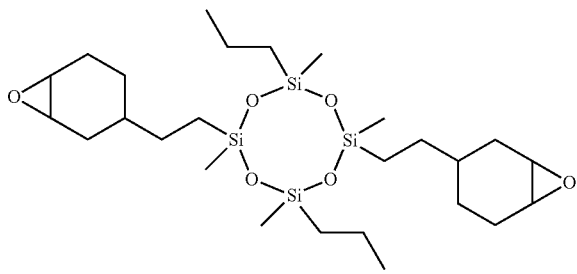
(d-5)

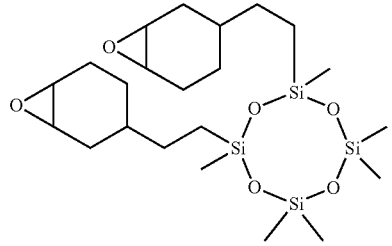
(d-6)

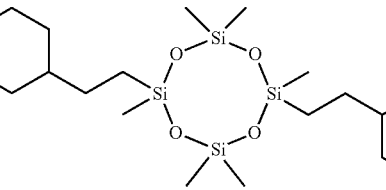
(d-7)

excluding a curable composition comprising compounds that contain one or more epoxy groups per molecule other than the cycloaliphatic epoxide (A), the siloxane compound (D), and a compound containing one or more glycidyl ether groups per molecule.

2. The curable composition according to claim 1 for lens formation, further comprising
a cationically curable compound containing one or more glycidyl ether groups per molecule, excluding compounds belonging to the cycloaliphatic epoxide (A) and the siloxane compound (D).

3. A method of forming a wafer-level lens, comprising:
curing the curable composition according to claim 1 to form the wafer-level lens.

4. A method of forming a Fresnel lens, comprising:
curing the curable composition according to claim 1 to form the Fresnel lens.

5. A method of forming a lens for camera flash, comprising:
curing the curable composition according to claim 1 to form the lens for camera flash.

* * * * *